US 12,429,564 B2

United States Patent
Moscovici

(10) Patent No.: US 12,429,564 B2
(45) Date of Patent: Sep. 30, 2025

(54) SYSTEMS AND METHODS FOR INTERLACED SCANNING IN LIDAR SYSTEMS

(71) Applicant: Innoviz Technologies Ltd., Rosh Ha'Ayin (IL)

(72) Inventor: Avishay Moscovici, Tel Aviv (IL)

(73) Assignee: Innoviz Technologies Ltd., Rosh Ha'Ayin (IL)

( * ) Notice: Subject to any disclaimer, the term of this patent is extended or adjusted under 35 U.S.C. 154(b) by 828 days.

(21) Appl. No.: 17/729,599

(22) Filed: Apr. 26, 2022

(65) Prior Publication Data
US 2022/0342047 A1    Oct. 27, 2022

Related U.S. Application Data

(60) Provisional application No. 63/179,598, filed on Apr. 26, 2021.

(51) Int. Cl.
| | | |
|---|---|---|
| *G01S 17/00* | (2020.01) | |
| *G01S 7/481* | (2006.01) | |
| *G01S 17/42* | (2006.01) | |
| *G01S 17/89* | (2020.01) | |
| *G01S 17/931* | (2020.01) | |

(52) U.S. Cl.
CPC ............ *G01S 7/4817* (2013.01); *G01S 17/42* (2013.01); *G01S 17/89* (2013.01); *G01S 17/931* (2020.01)

(58) Field of Classification Search
CPC ........ G01S 17/00; G01S 17/10; G01S 7/4817; G01S 17/42; G01S 17/89; G01S 17/931; G01S 7/484; G01S 17/58
See application file for complete search history.

(56) References Cited

U.S. PATENT DOCUMENTS

| | | | |
|---|---|---|---|
| 9,905,992 B1 * | 2/2018 | Welford | G01S 7/4814 |
| 2018/0081037 A1 | 3/2018 | Medina et al. | |
| 2018/0081038 A1 | 3/2018 | Medina et al. | |
| 2018/0100928 A1 | 4/2018 | Keilaf et al. | |
| 2018/0113200 A1 * | 4/2018 | Steinberg | G08G 1/166 |
| 2018/0113216 A1 | 4/2018 | Kremer et al. | |
| 2022/0146815 A1 * | 5/2022 | Lu | H05B 1/023 |

* cited by examiner

*Primary Examiner* — Abdullahi Nur
(74) *Attorney, Agent, or Firm* — Meitar Patents Ltd.; Daniel Kligler

(57) ABSTRACT

A LIDAR system includes at least one light source; at least one deflector configured to scan light emitted by the at least one light source over a field of view of the LIDAR system; and at least one processor configured to cause the at least one deflector to scan the field of view of the LIDAR system with a first scan pattern including a first series of scan lines and subsequently with a second scan pattern including a second series of scan lines that are interlaced with the first series of scan lines to provide a single frame scan pattern, and analyze reflection signals associated with the single frame scan pattern to determine whether at least one target object present in the field of view of the LIDAR system is moving.

26 Claims, 34 Drawing Sheets

SYSTEMS AND METHODS FOR INTERLACED SCANNING IN LIDAR SYSTEMS

CROSS REFERENCE TO RELATED APPLICATION

The present application claims priority to U.S. Provisional Patent Application No. 63/179,598, filed Apr. 26, 2021, which is incorporated herein by reference in its entirety.

BACKGROUND

I. Technical Field

The present disclosure relates generally to technology for scanning a surrounding environment and, for example, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to pivot around at least one axis for projecting the light into a desired location in the field of view of the electro-optical system. It may be desirable to design improved systems and methods for determining the position and/or orientation of the light deflector for controlling and/or monitoring the movement of the light deflector with precision.

The systems and methods of the present disclosure are directed towards improving performance of monitoring the position and/or orientation of a light deflector used in electro-optical systems.

SUMMARY

One aspect of the present disclosure is directed a LIDAR system. The LIDAR system may include at least one light source; at least one deflector configured to scan light emitted by the at least one light source over a field of view of the LIDAR system; and at least one processor configured to cause the at least one deflector to scan the field of view of the LIDAR system with a first scan pattern including a first series of scan lines and subsequently with a second scan pattern including a second series of scan lines that are interlaced with the first series of scan lines; and cause, based on detection of a triggering event, adjustment of at least one of a laser pulse frequency associated with the at least one light source or a tilt increment associated with the at least one deflector to selectively adjust a scan resolution relative to the field of view of the LIDAR system.

Another aspect of the present disclosure is directed to a LIDAR system that may include at least one light source configured to simultaneously emit a plurality of laser light beams; at least one deflector configured to scan the plurality of laser light beams emitted by the at least one light source over a field of view of the LIDAR system; and at least one processor configured to cause the at least one deflector to scan the field of view of the LIDAR system with a first deflector scan pattern including a first series of scan line sets and subsequently with a second deflector scan pattern including a second series of scan line sets that are interlaced with the first series of scan line sets.

Yet another aspect of the present disclosure is directed to a LIDAR system that may include at least one light source; at least one deflector configured to scan light emitted by the at least one light source over a field of view of the LIDAR system; and at least one processor configured to cause the at least one deflector to scan the field of view of the LIDAR system with a first scan pattern including a first series of scan lines and subsequently with a second scan pattern including a second series of scan lines that are interlaced with the first series of scan lines to provide a single frame scan pattern; and analyze reflection signals associated with the single frame scan pattern to determine whether at least one target object present in the field of view of the LIDAR system is moving.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1A:
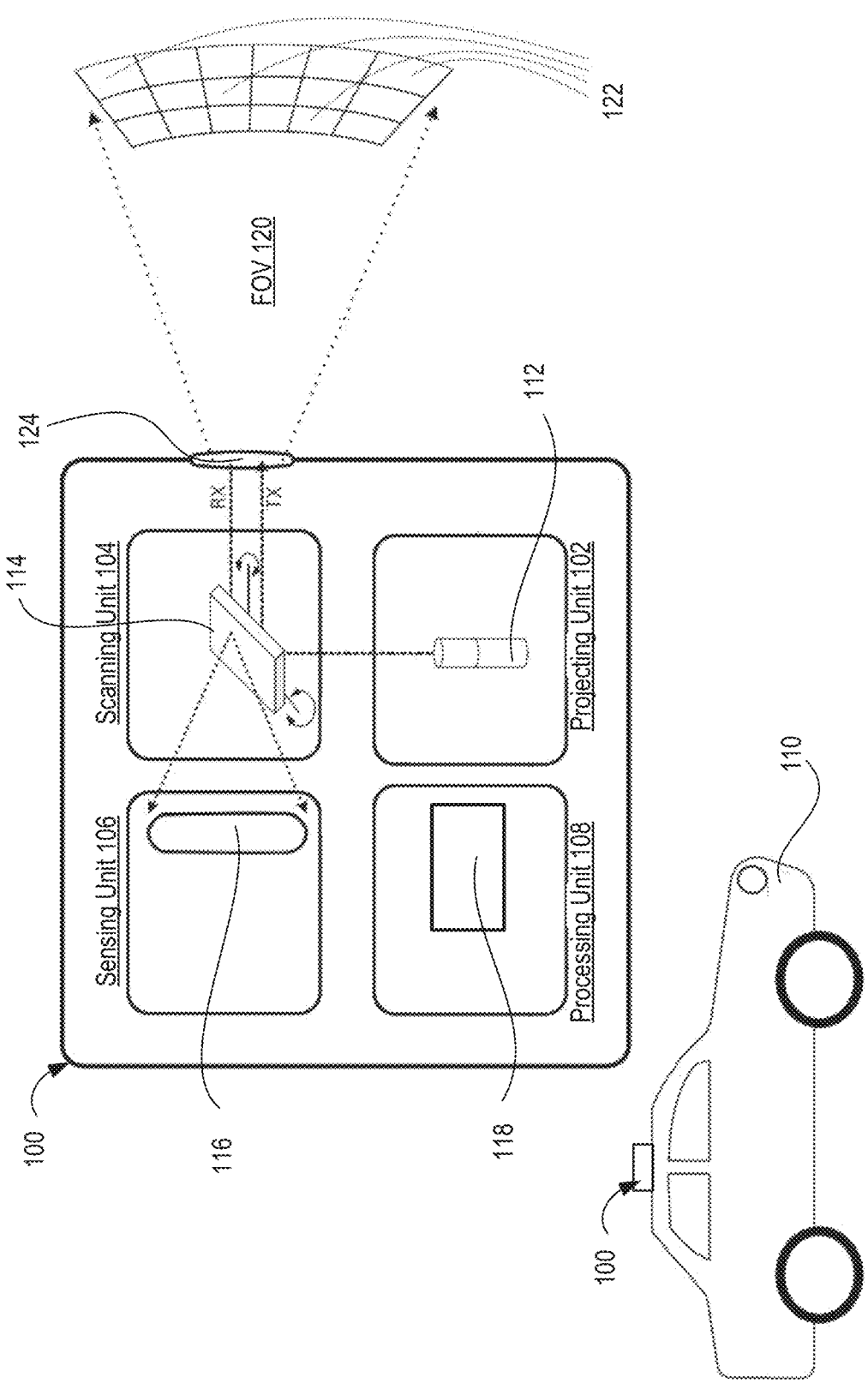
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, ±40°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road); recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detect light reflected from a portion of the object, e.g., because ambient light or other interferences interfere with detection of some portions of the object.

Consistent with the present disclosure, a LIDAR system may be configured to detect objects by scanning the environment of the LIDAR system. The term "scanning the environment of the LIDAR system" broadly includes illuminating the field of view or a portion of the field of view of the LIDAR system. In one example, scanning the environment of the LIDAR system may be achieved by moving or pivoting a light deflector to deflect light in differing directions toward different parts of the field of view. In another example, scanning the environment of the LIDAR system may be achieved by changing a positioning (i.e. location and/or orientation) of a sensor with respect to the field of view. In another example, scanning the environment of the LIDAR system may be achieved by changing a positioning (i.e. location and/or orientation) of a light source with respect to the field of view. In yet another example, scanning the environment of the LIDAR system may be achieved by changing the positions of at least one light source and of at least one sensor to move rigidly with respect to the field of view (i.e. the relative distance and orientation of the at least one sensor and of the at least one light source remains).

As used herein the term "field of view of the LIDAR system" may broadly include an extent of the observable environment of the LIDAR system in which objects may be detected. It is noted that the field of view (FOV) of the LIDAR system may be affected by various conditions such as but not limited to: an orientation of the LIDAR system (e.g. in the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, the LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, manmade objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system).The term "point cloud point" refers to a point in space (which may be dimensionless, or a miniature cellular space, e.g. 1 cm$^3$), and whose location may be described by the point cloud model using a set of coordinates (e.g. (X,Y,Z), (r,φ,θ)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light to deviate to differing degrees (e.g. discrete degrees, or over a continuous span of degrees). The light deflector may optionally be controllable in different ways (e.g. deflect to a degree α, change deflection angle by Δα, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g. along a predefined scanning route) or otherwise. With respect to the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axes of rotation, while substantially maintaining a fixed center of rotation. In one embodiment, the pivoting of the light deflector may include rotation of the light deflector about a fixed axis (e.g., a shaft), but this is not necessarily so. For example, in some MEMS mirror implementations, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure, it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of the light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV, the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view (FOV) 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflection signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof of vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having a field of view of 75° looking ahead of the vehicle, and possibly a second LIDAR system 100 with a similar FOV looking backward (optionally with a lower detection range). It is also noted that different vertical field of view angles may also be implemented.

Figure 1B:
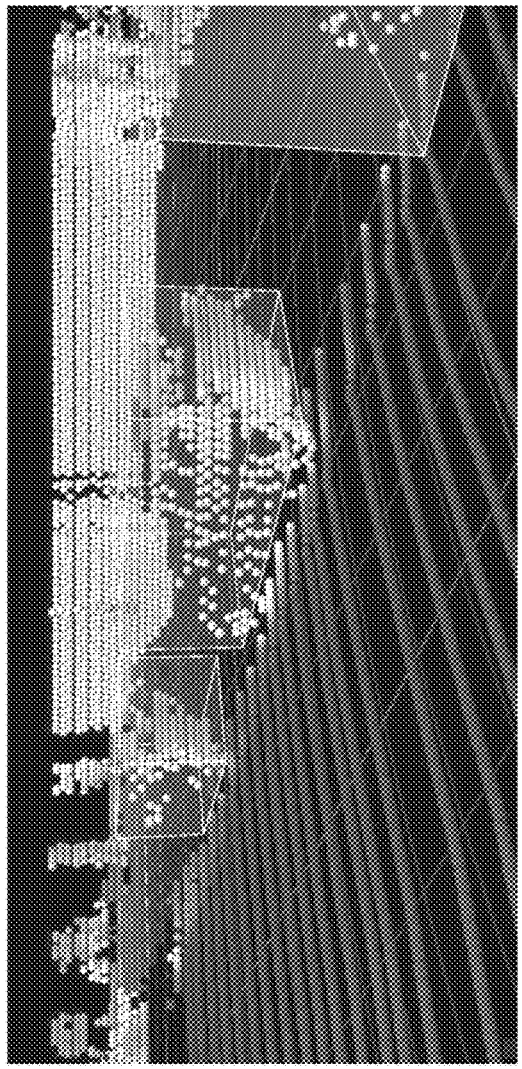
FIG. 1B is an image showing an exemplary output of a single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
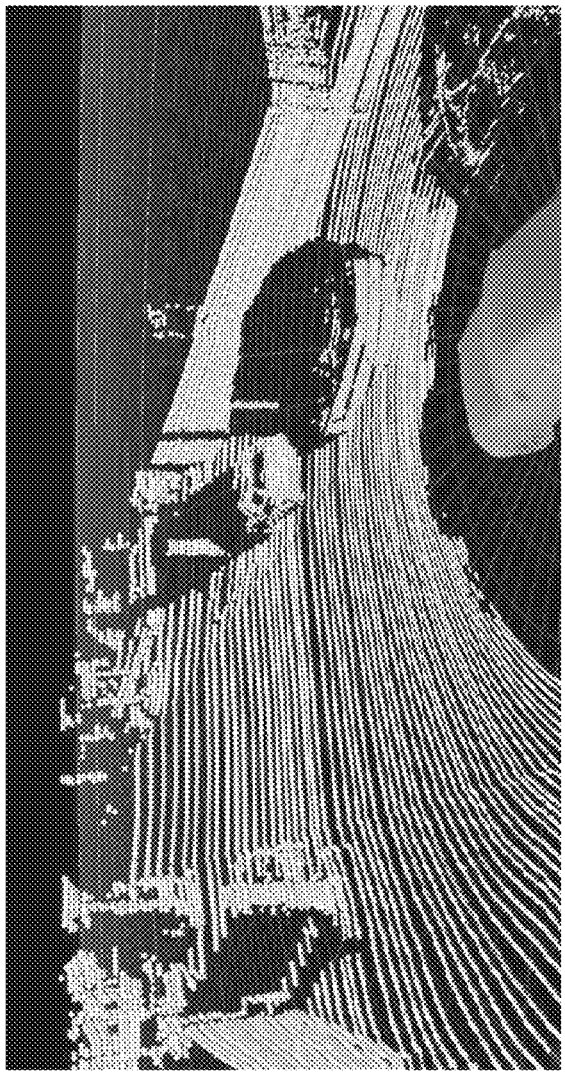
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
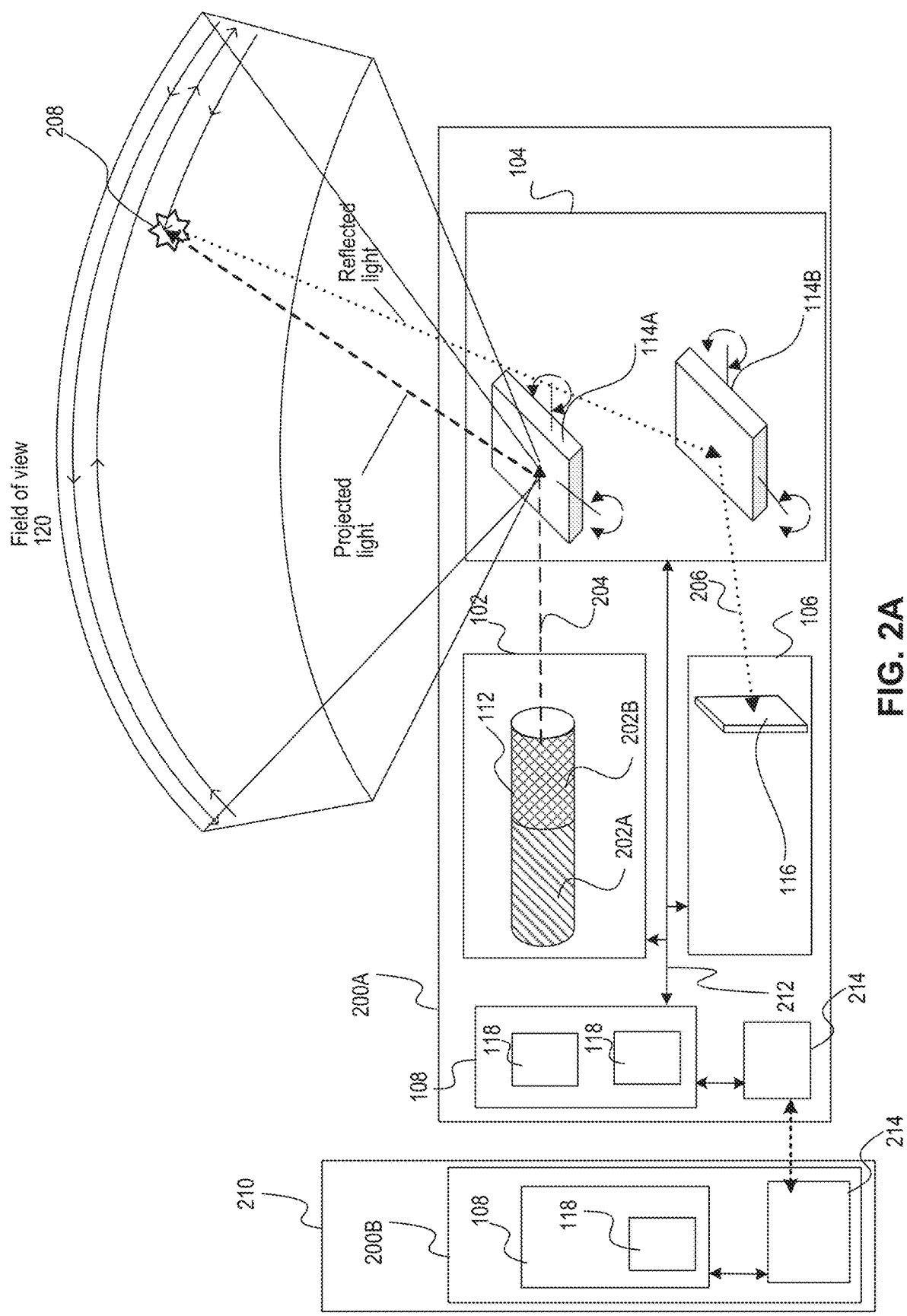
FIGS. 2A, 2B, 2C, 2D, 2E, 2F, and 2G are diagrams illustrating different configurations of projecting units in accordance with some embodiments of the present disclosure.
Figure 2B:
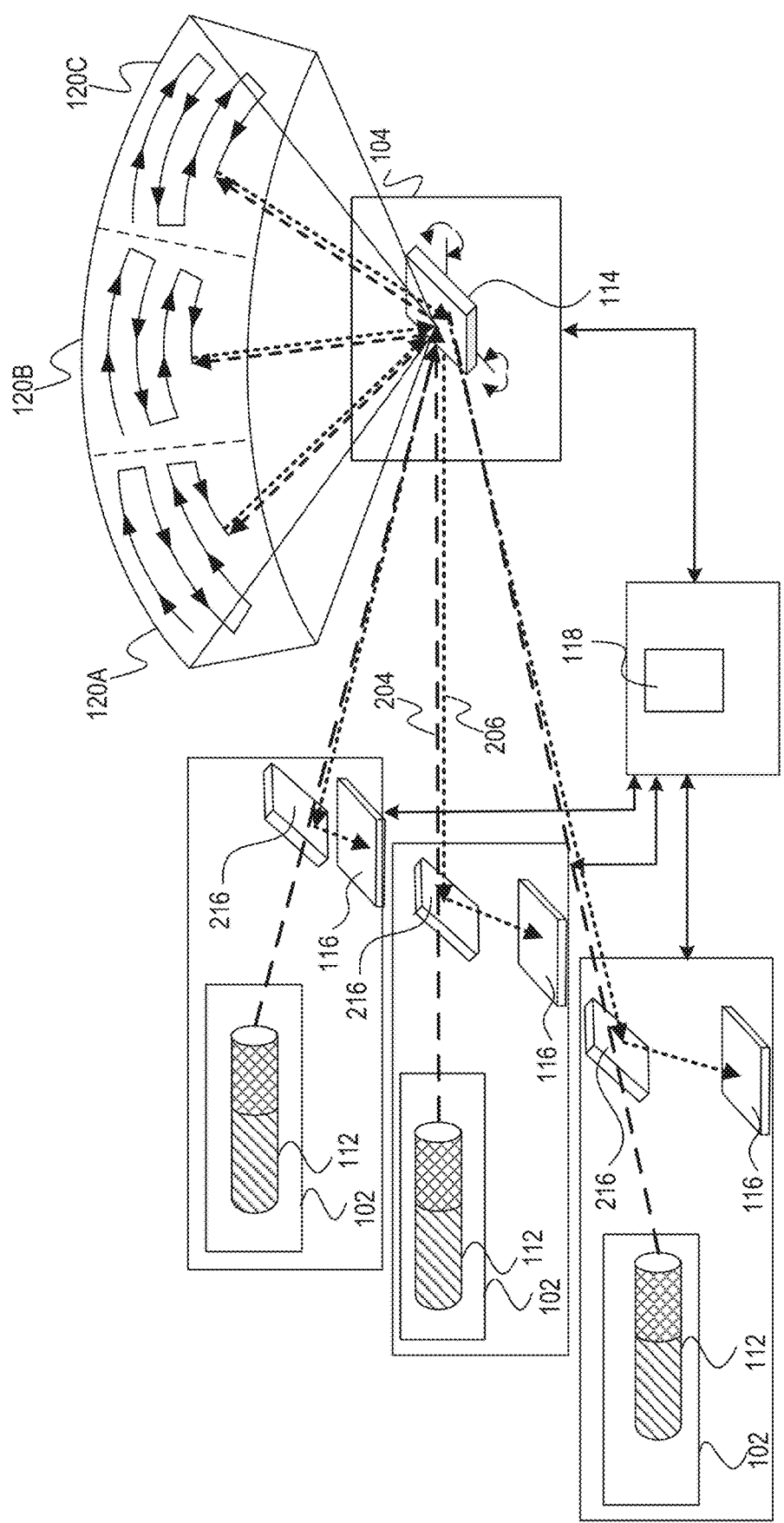
Figure 2C:
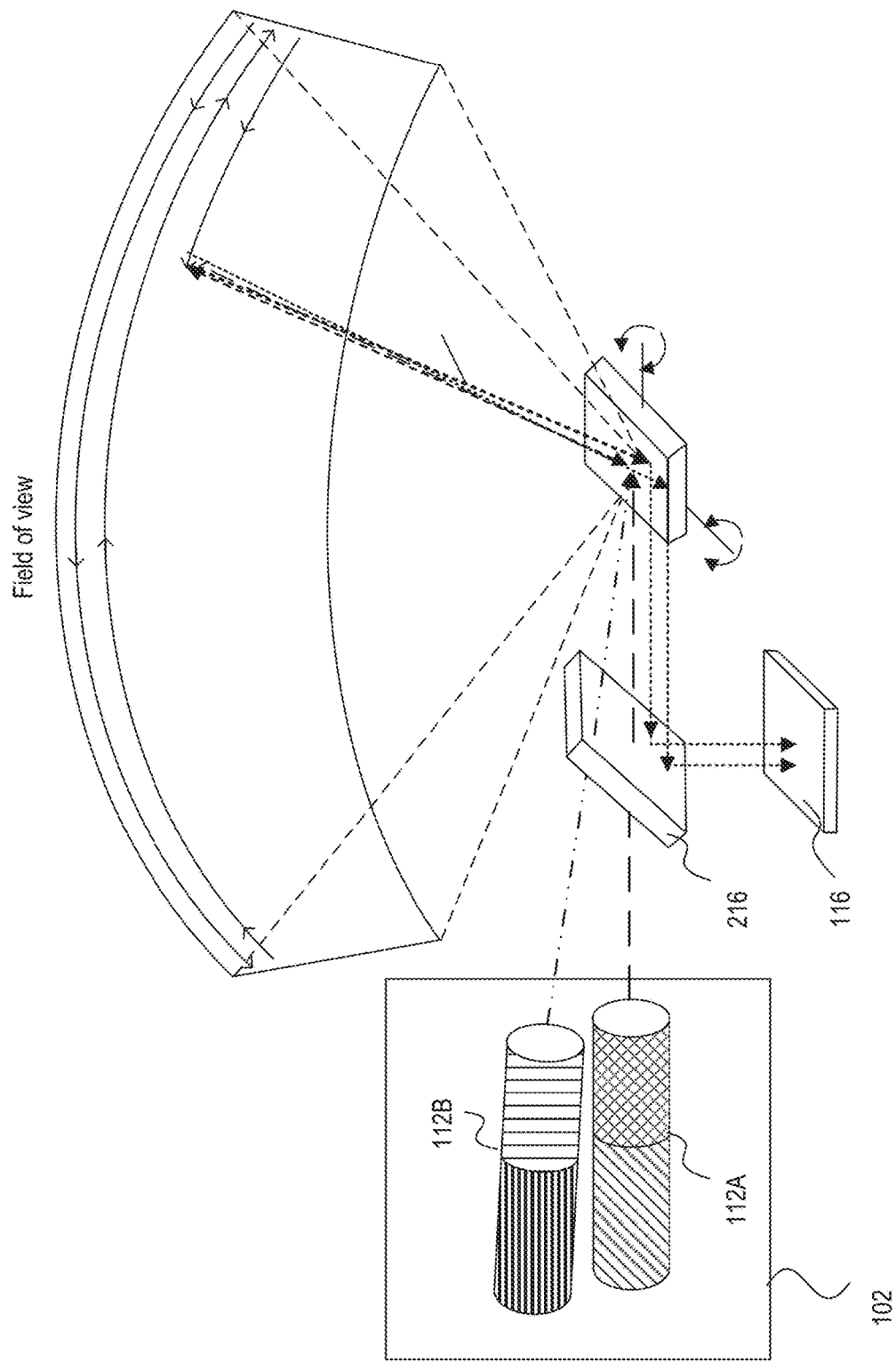
Figure 2D:
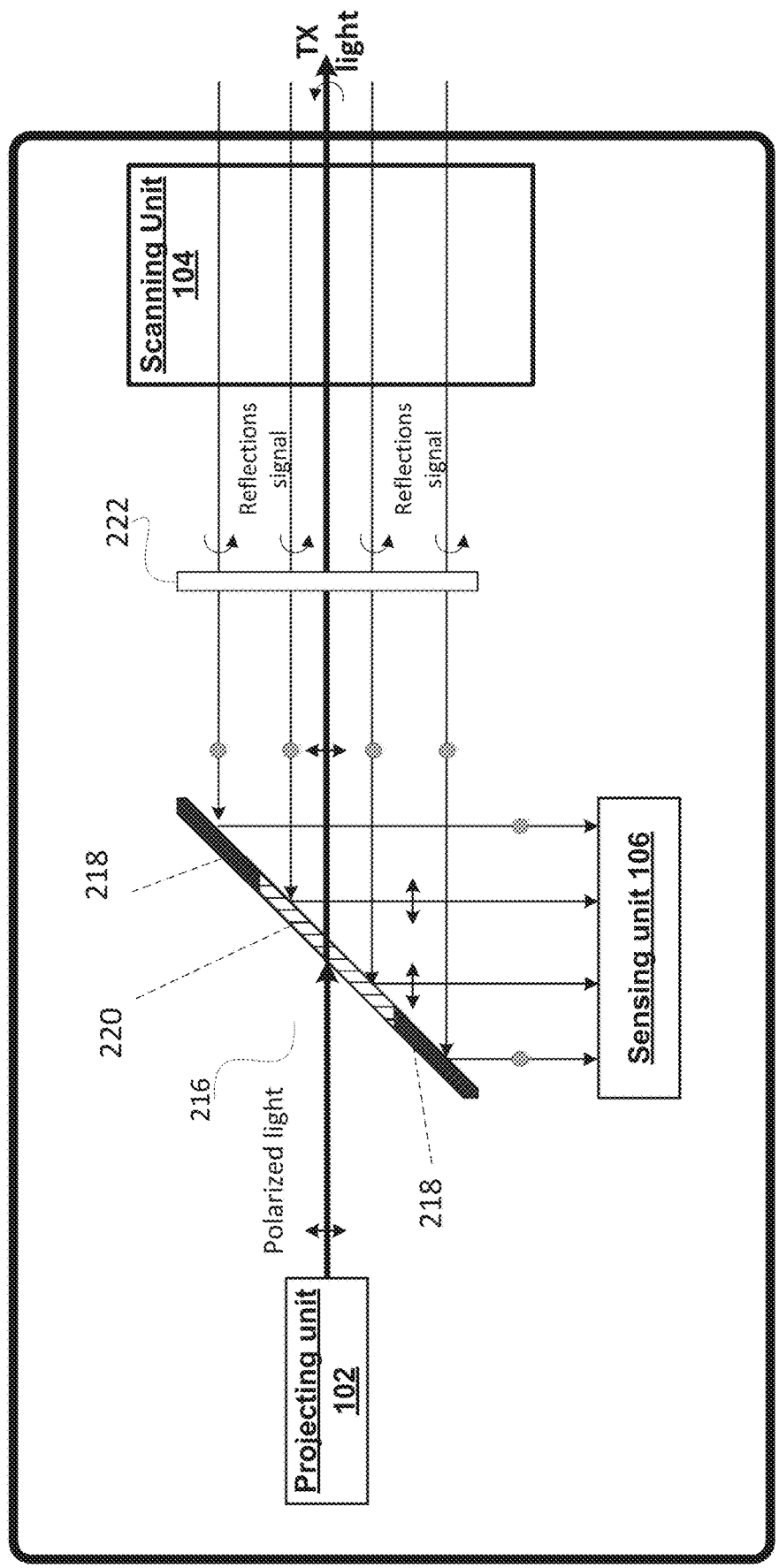
Figure 2E:
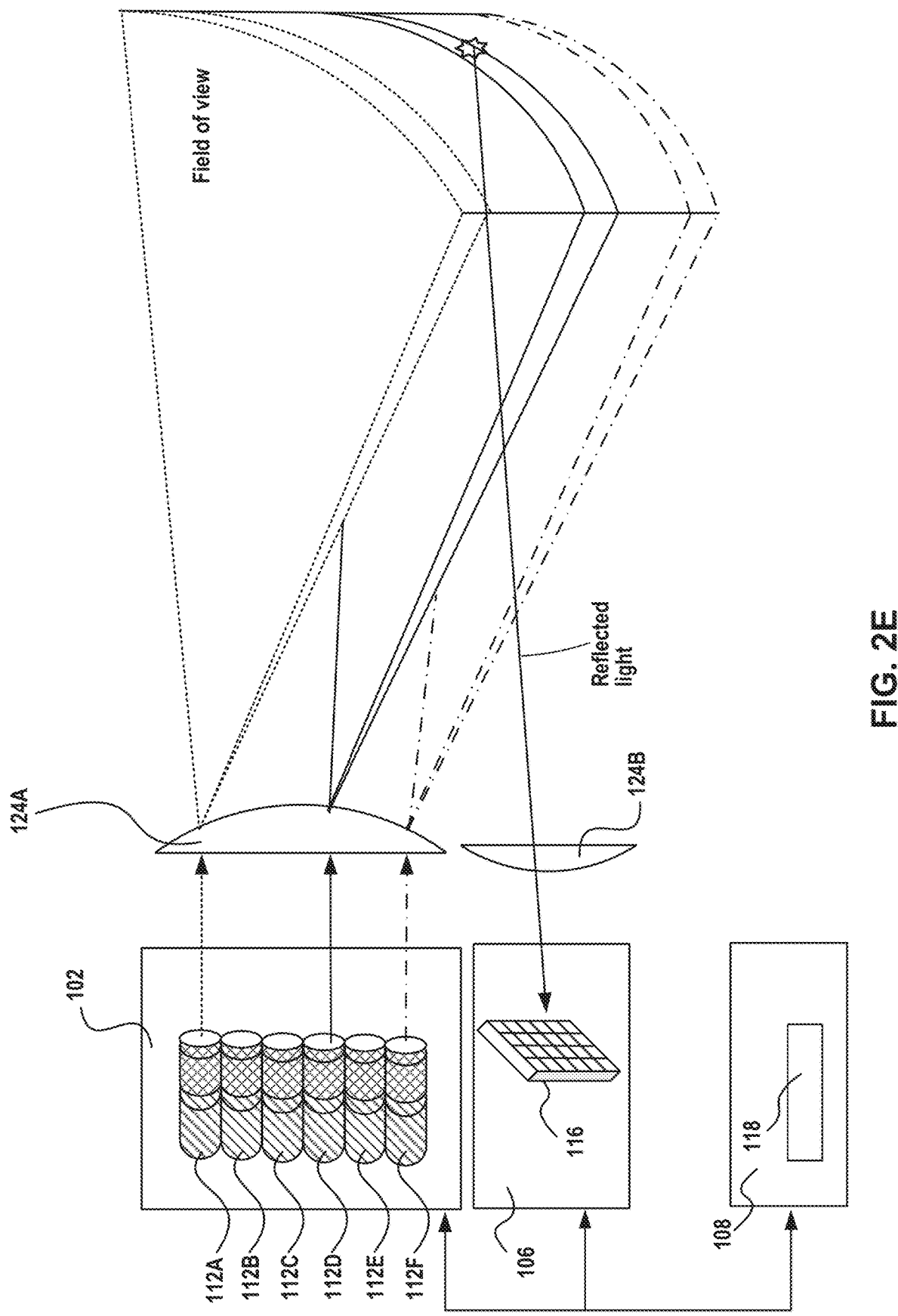
Figure 2F:
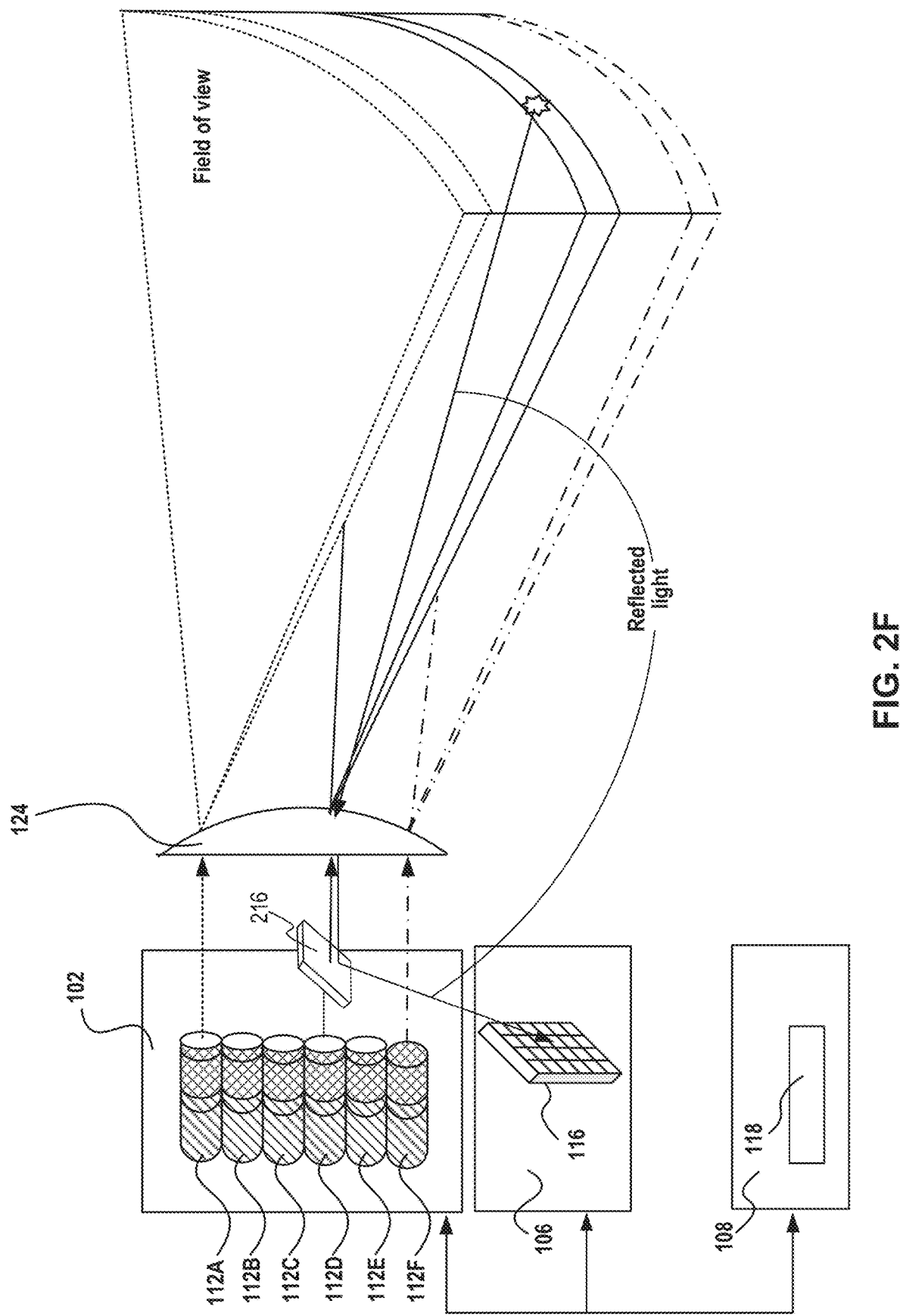
Figure 2G:
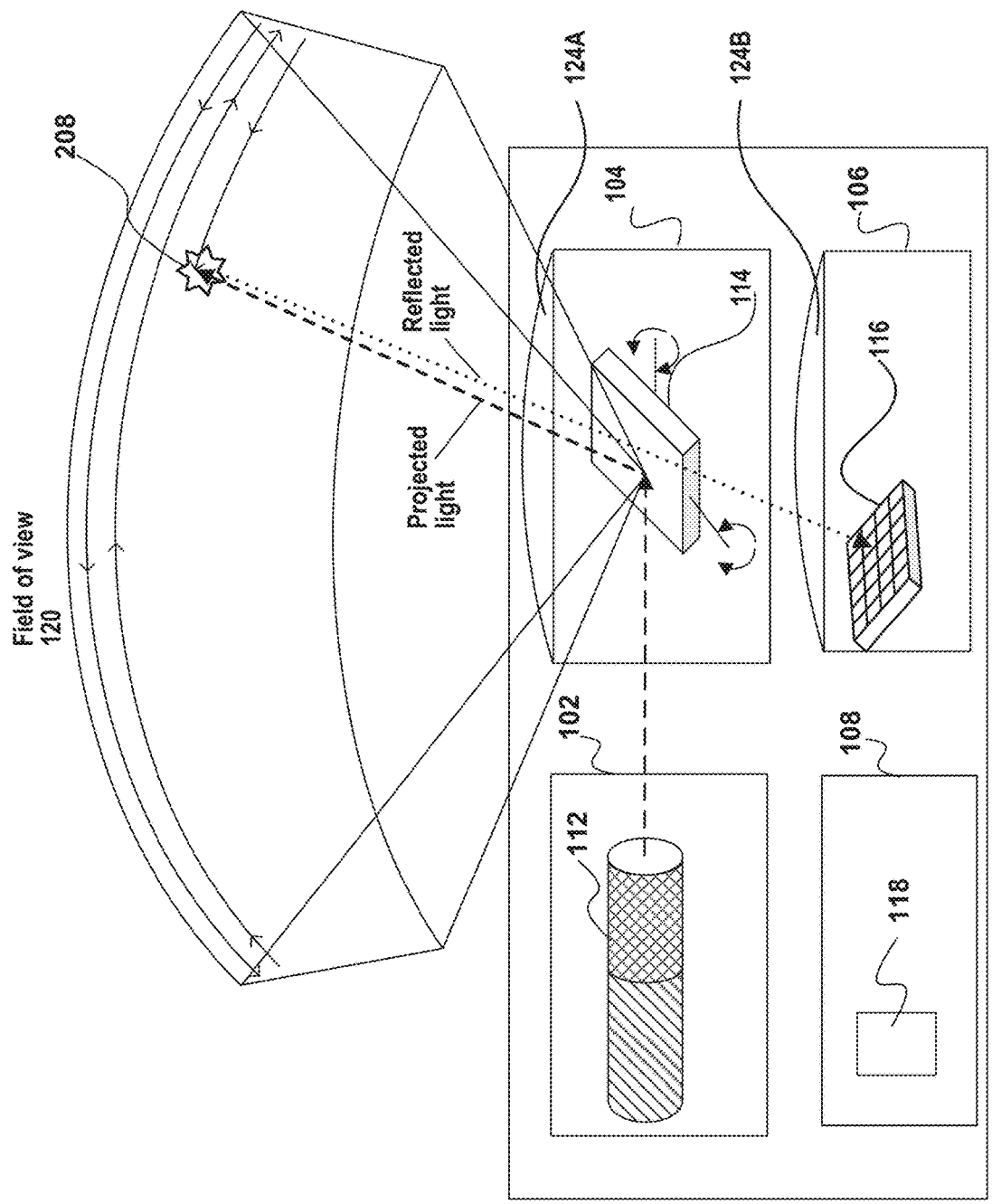

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration"

broadly refers to LIDAR system configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or two or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 may also include a pivotable return deflector 114B that directs photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such a computing environment may include at least one processor and/or may be connected to LIDAR system 100 via the cloud. In some embodiments, host 210 may also include interfaces to external devices such as a camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. An example of such an embodiment is described below with reference to FIG. 6D.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hit an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical deflector 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength to which the human eye is not sensitive in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path as the light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such as a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will rely on the functionalities and capabilities of the secondary light source 112B. While the capabilities of secondary light source 112B may be inferior to the capabilities of primary light source 112A, LIDAR system 100 system may be designed in such a fashion to enable vehicle 110 to safely arrive at its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflection signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performance when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number of photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a circular polarization to a linear polarization (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
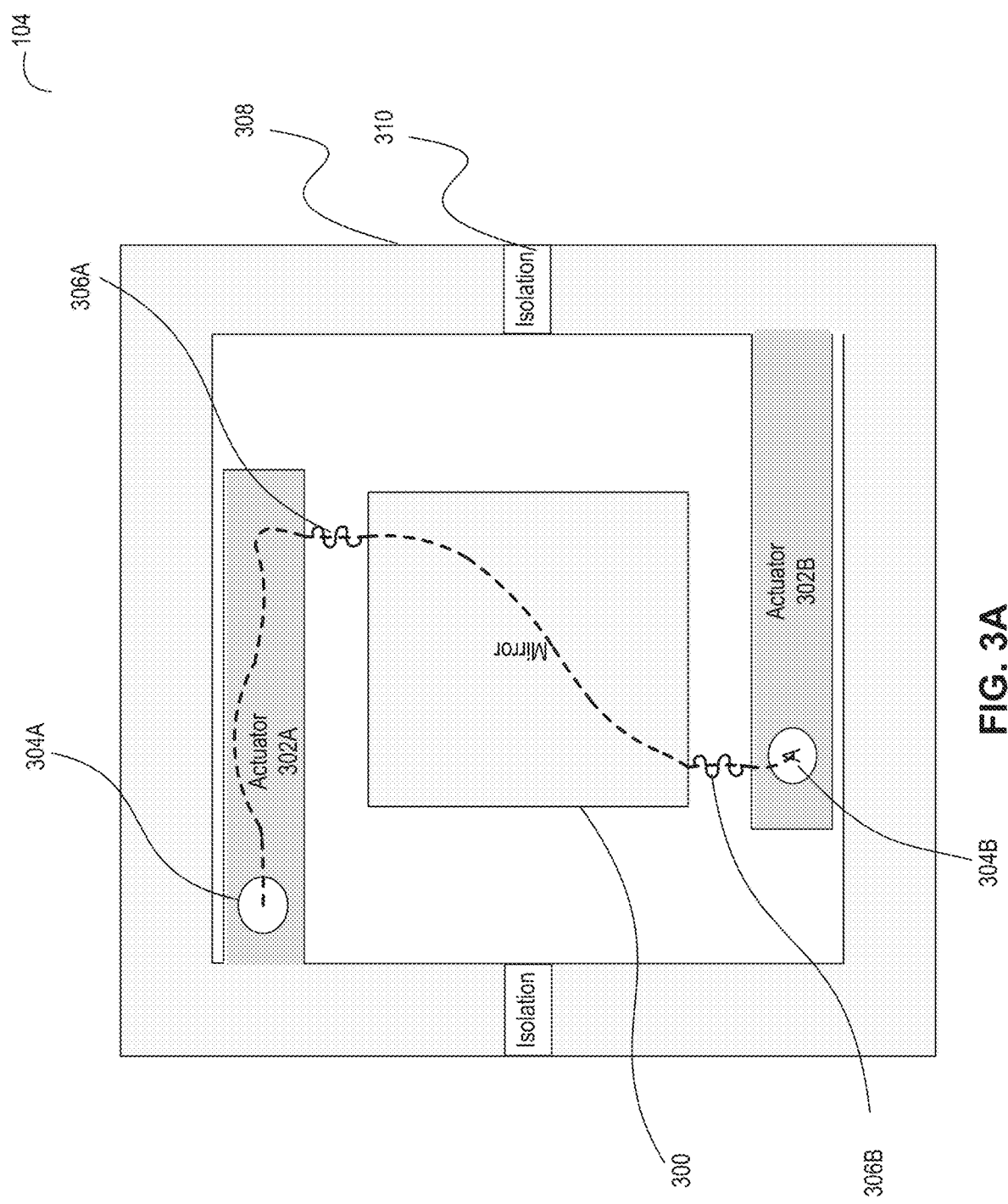
FIGS. 3A, 3B, 3C, and 3D are diagrams illustrating different configurations of scanning units in accordance with some embodiments of the present disclosure.
Figure 3B:
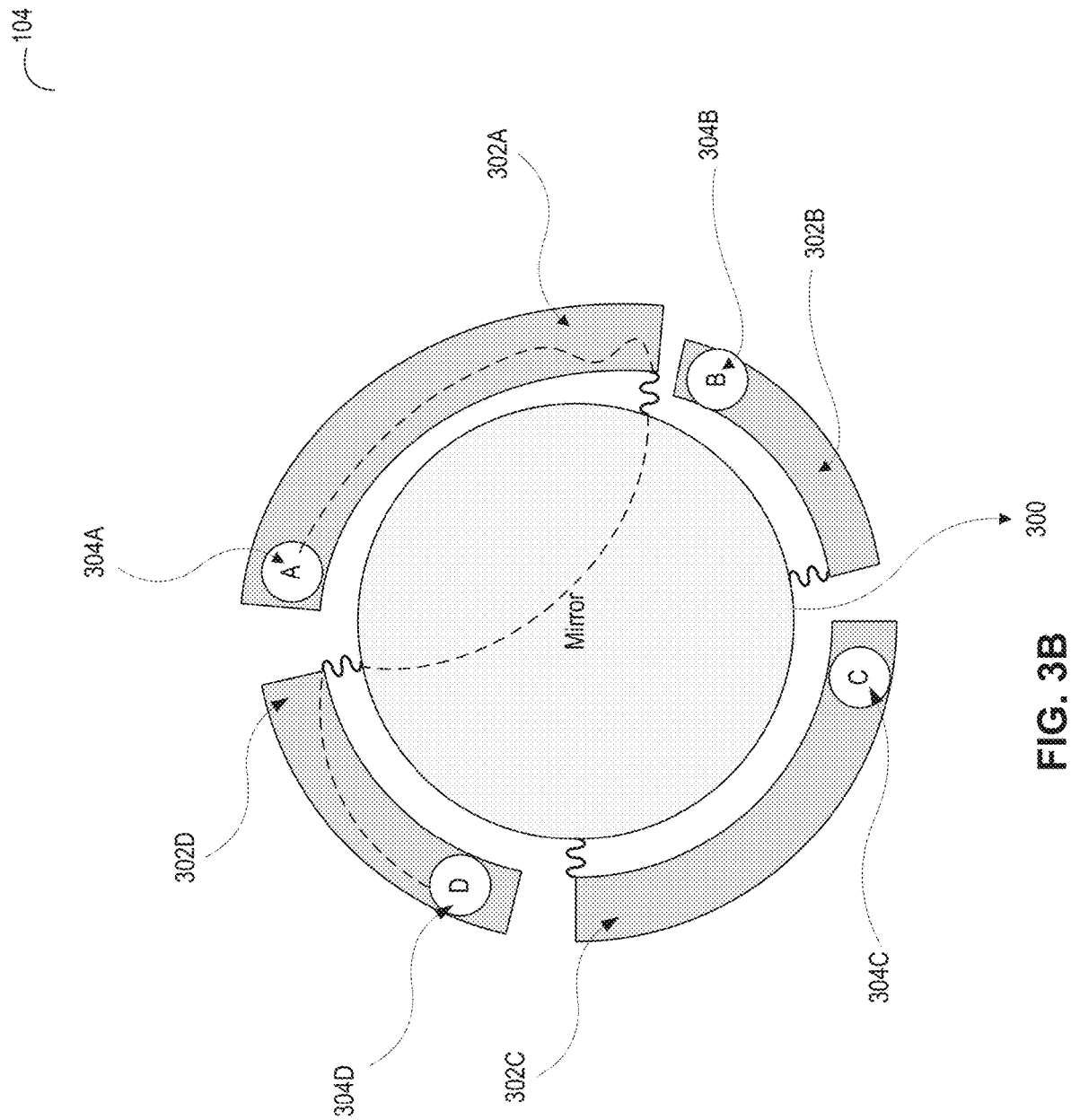
Figure 3C:
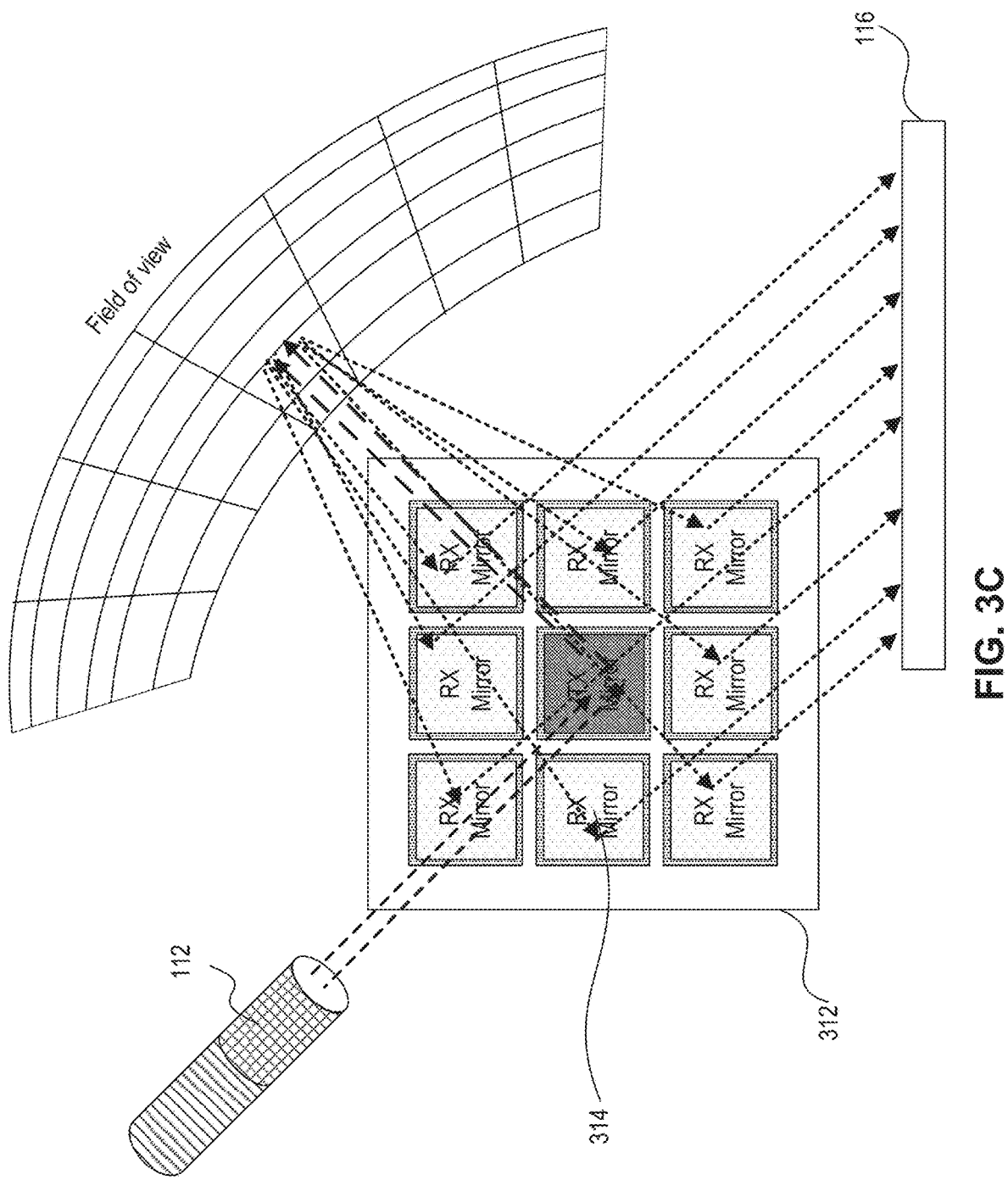
Figure 3D:
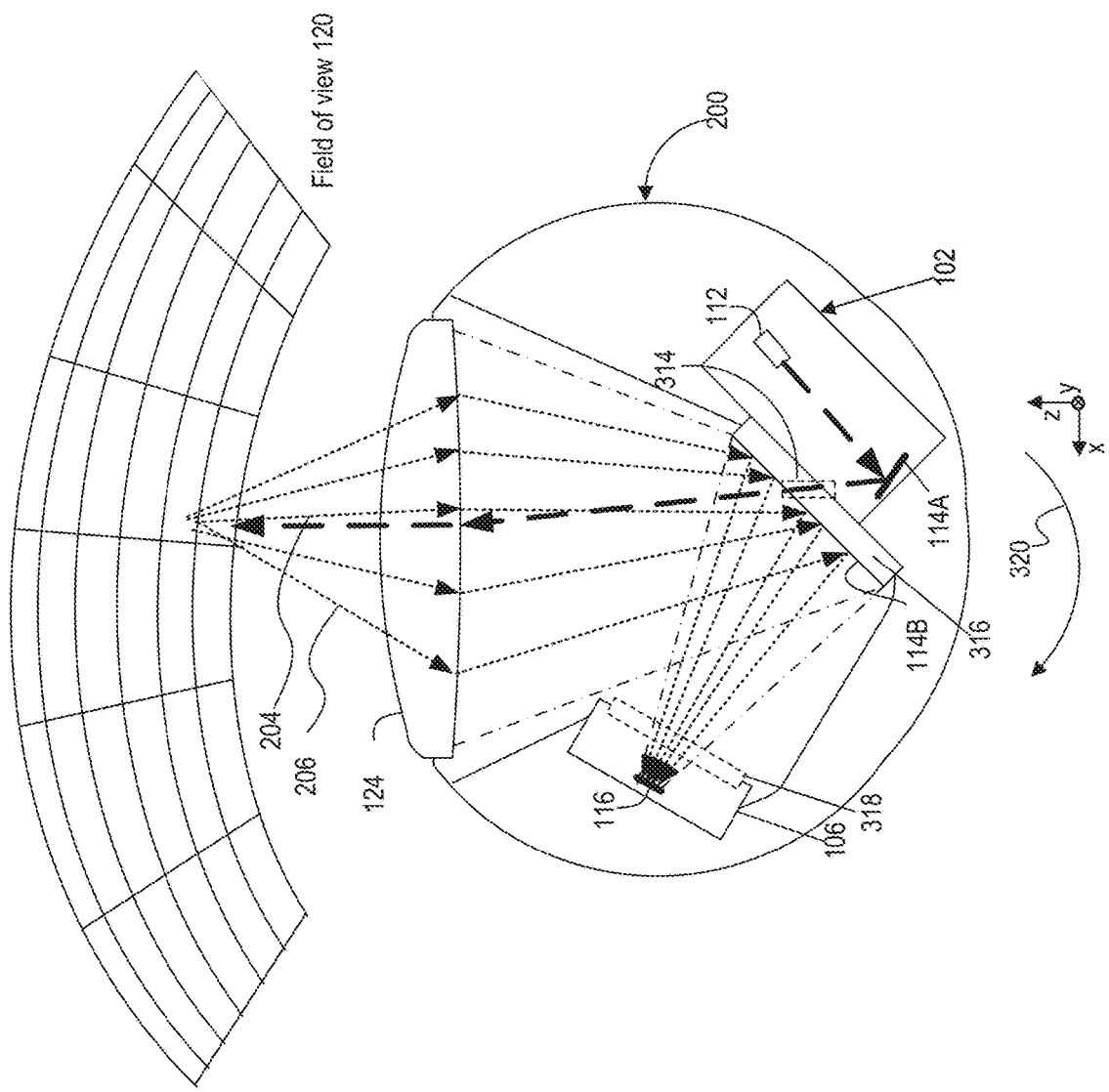

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be controlled based on an associated scanner position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least one deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least one deflector 114, such that power to move MEMS mirror 300 is applied directly towards it. In addition, MEMS mirror 300 may be connected to frame 308 by one or more rigid supporting elements. In another embodiment, at least one deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided above with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector unit 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photon's beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travels towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating multiple light sources or multiple sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of view 120. Although FIG. 3D illustrates that the LIDAR system 100 is rotated clockwise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
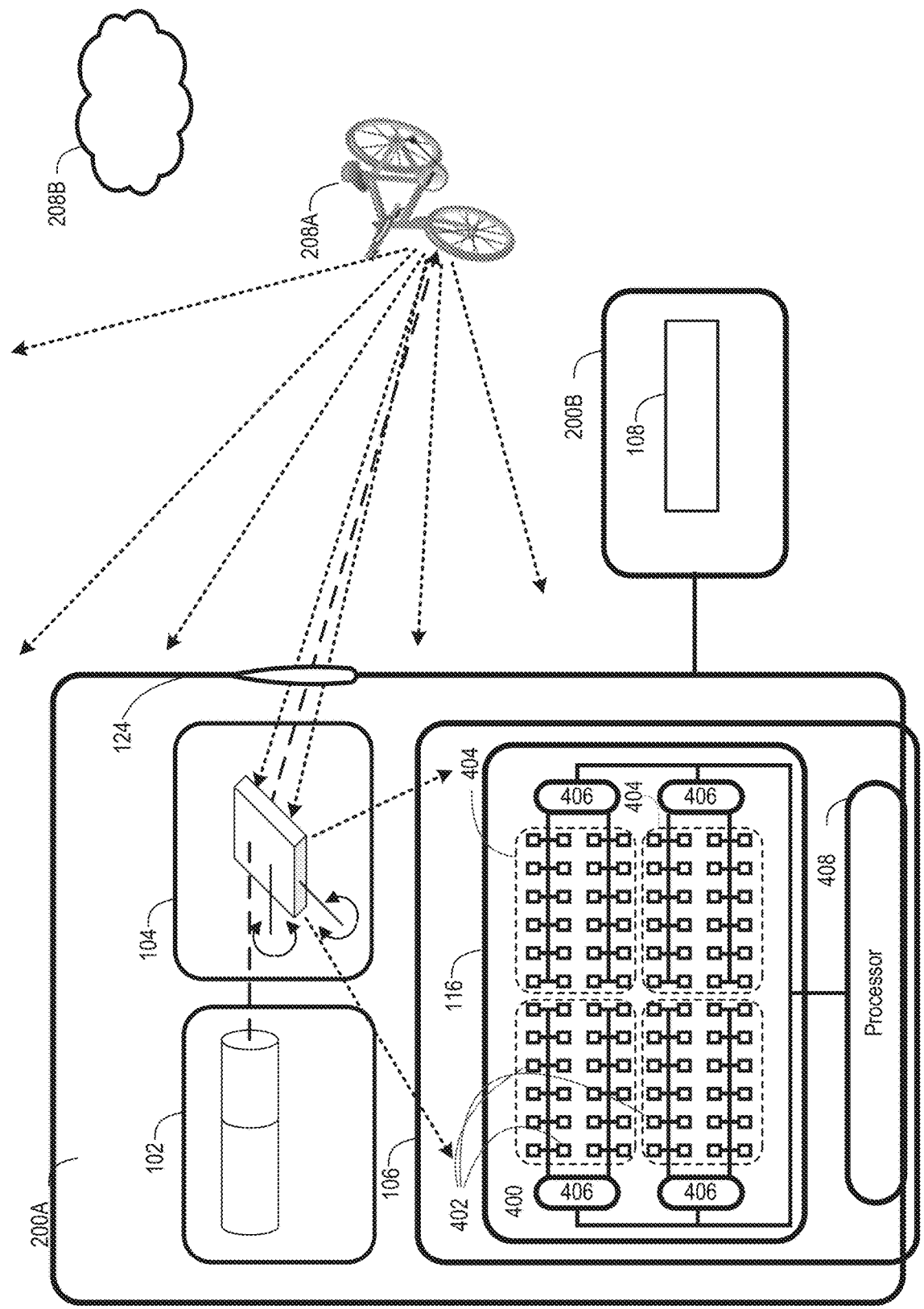
FIGS. 4A, 4B, 4C, 4D, and 4E are diagrams illustrating different configurations of sensing units in accordance with some embodiments of the present disclosure.
Figure 4B:
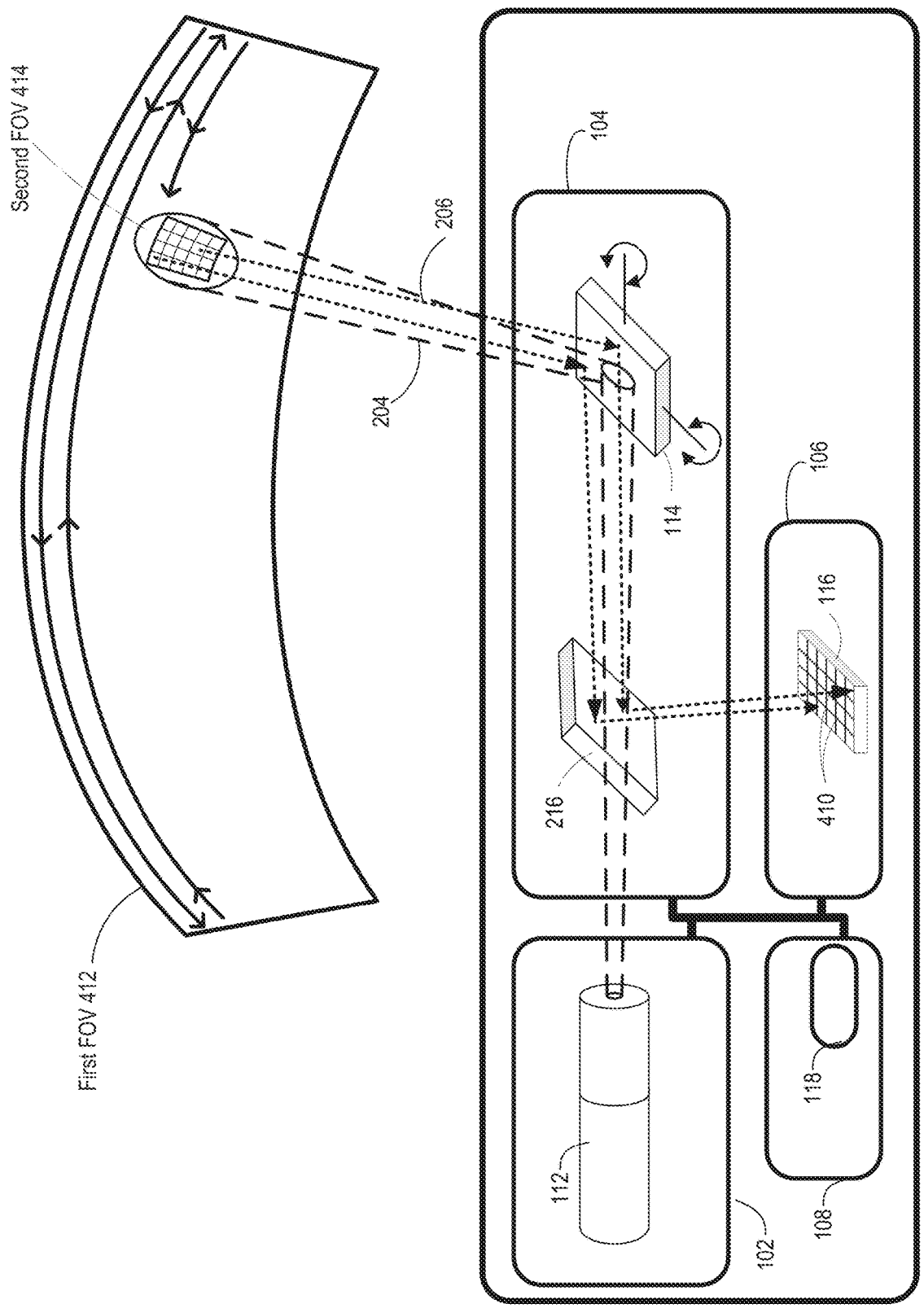
Figure 4C:
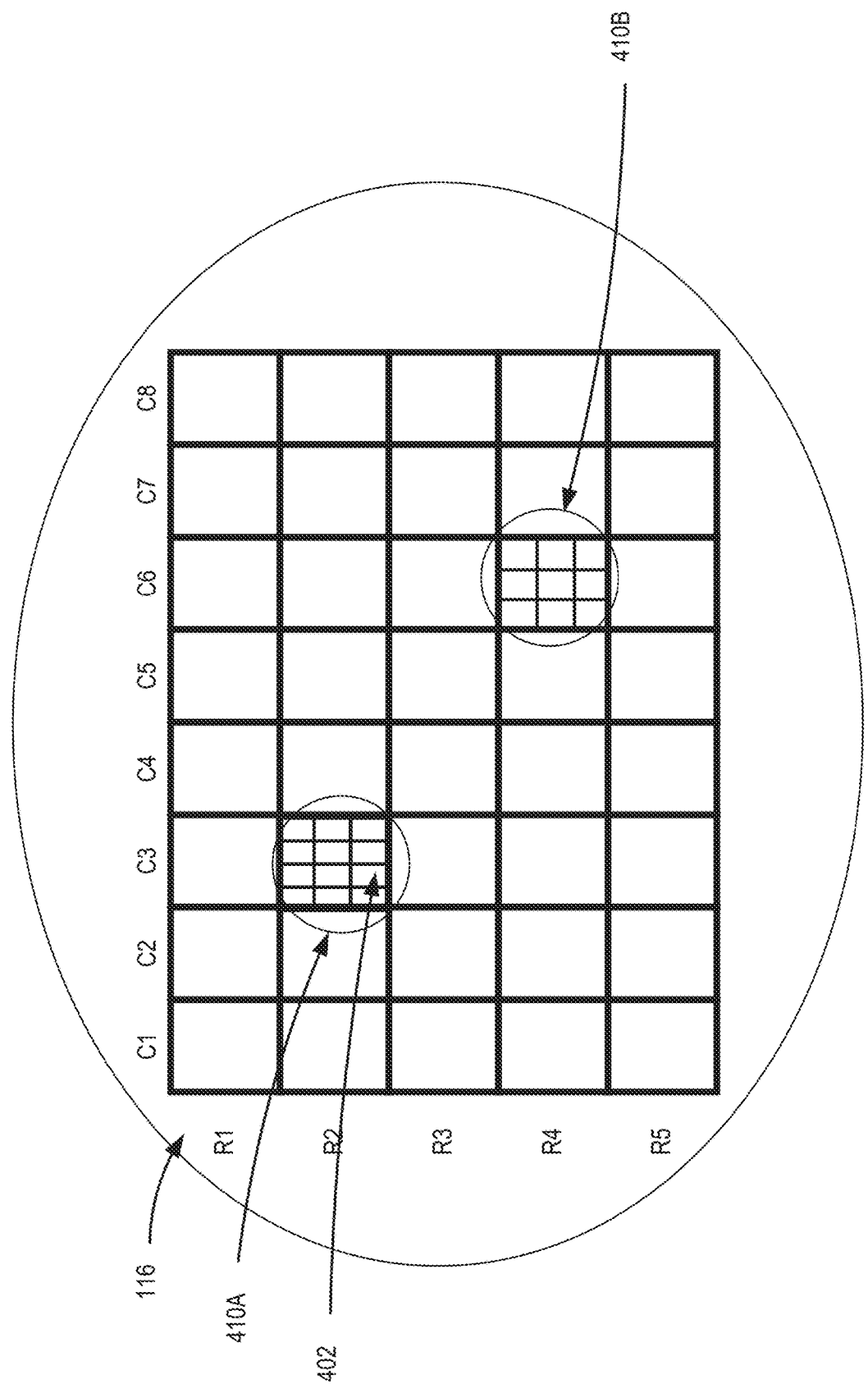
Figure 4D:
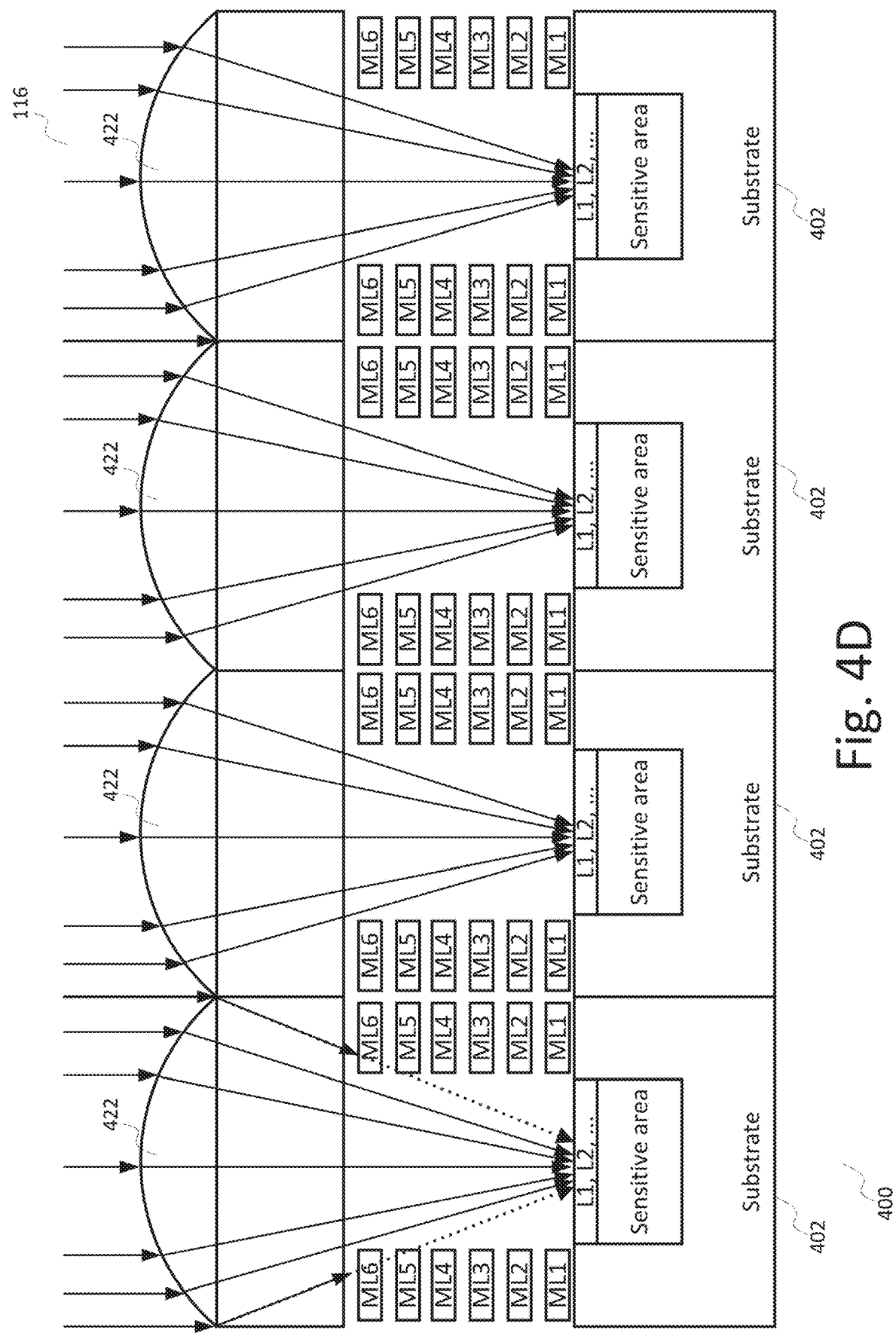

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagrams illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the regional of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented with multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g. summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 414" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 414 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when at least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LIDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402.

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
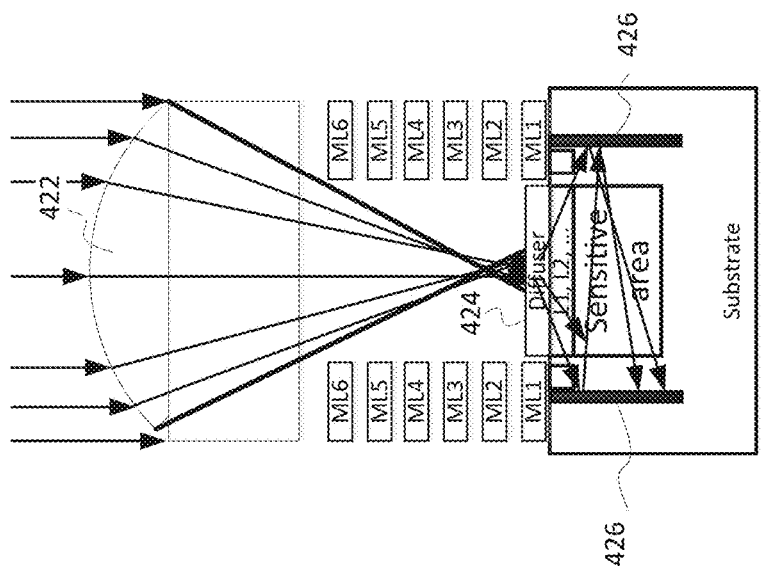
Figure 4E:
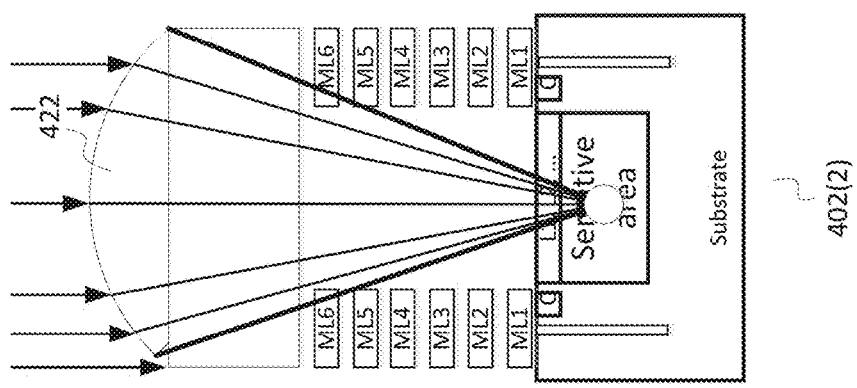
Figure 4E:
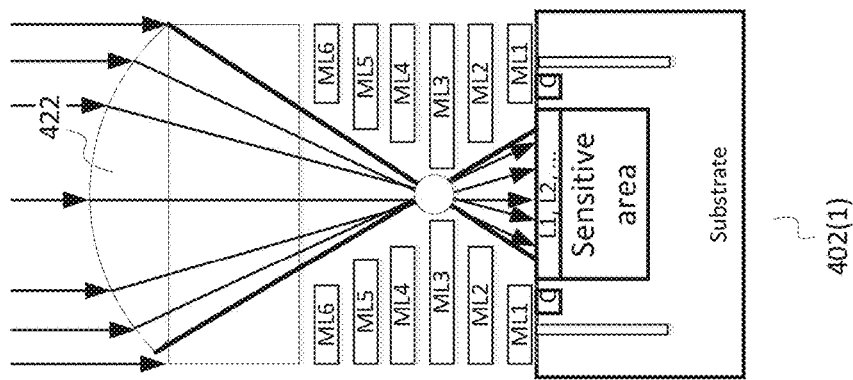

FIG. 4E illustrates three detection elements 402, each with an associated lens 422, in accordance with examples of the presently disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LIDAR design with a narrow field of view where the incoming light beam includes parallel rays and the imaging focus does not have any consequence to the detected signal.

In the lens configuration illustrated with regards to detection element 402(2), an efficiency of photon detection by the detection elements 402 may be improved by identifying a "sweet spot." Specifically, a photodetector implemented in CMOS may have a "sweet spot" in the sensitive volume area where the probability of a photon creating an avalanche effect is the highest. Therefore, a focal point of lens 422 may be positioned inside the sensitive volume area at the "sweet spot" location, as demonstrated by detection element 402(2). The lens shape and distance from the focal point may take into account the refractive indices of all the elements the laser beam is passing along the way from the lens to the sensitive "sweet spot" location buried in the semiconductor material.

In the lens configuration illustrated with regards to detection element 402(3) on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. Detection element 402(3) in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detection element 402 may be designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detection element 402 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configurations, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 to prioritize the overall probability of detection of the entire array 400 (preventing photons from being "wasted" in the dead area between detectors/sub-detectors) at the expense of spatial distinctiveness. This embodiment is in contrast to prior art implementations such as a CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lenses 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal plane to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1% or 0.1% of the FOV, while in other implementations the scanned area may cover 10% or 25% of the FOV. All other relative portions of the FOV values may also be implemented, of course.

The Processing Unit

Figure 5A:
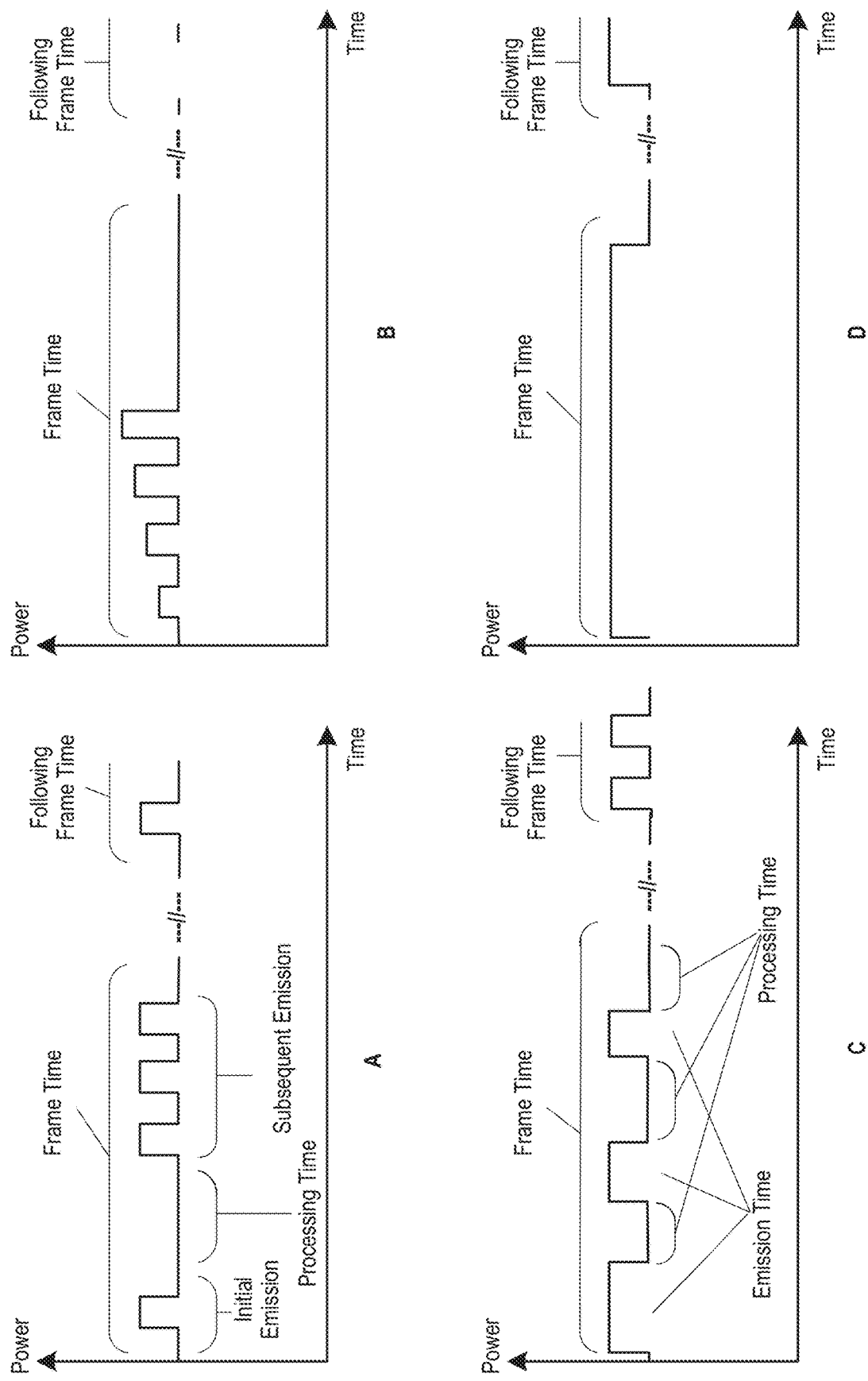
FIG. 5A includes four example diagrams illustrating emission patterns in a single frame-time for a single portion of the field of view.
Figure 5B:
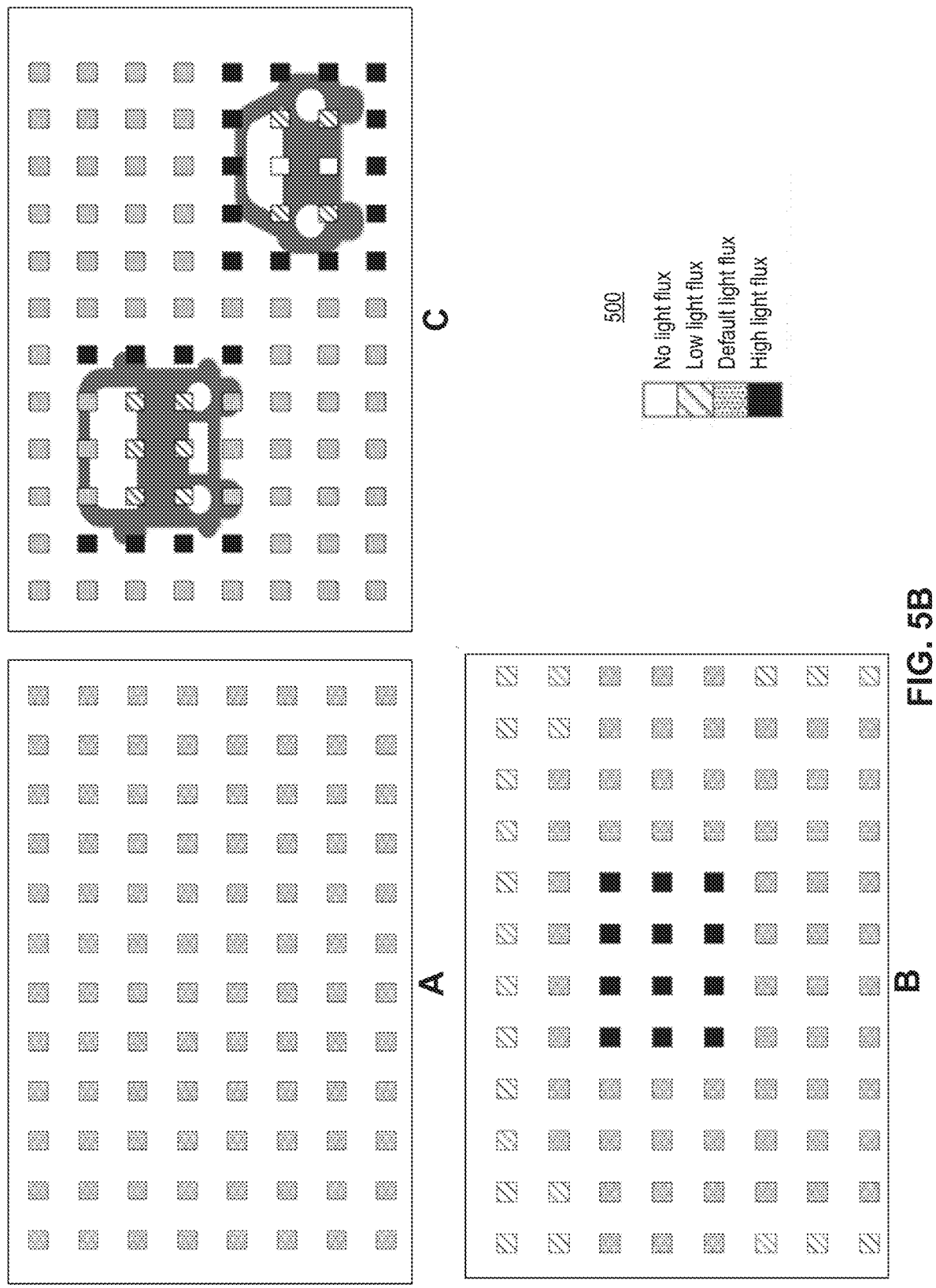
FIG. 5B includes three example diagrams illustrating emission scheme in a single frame-time for the whole field of view.
Figure 5C:
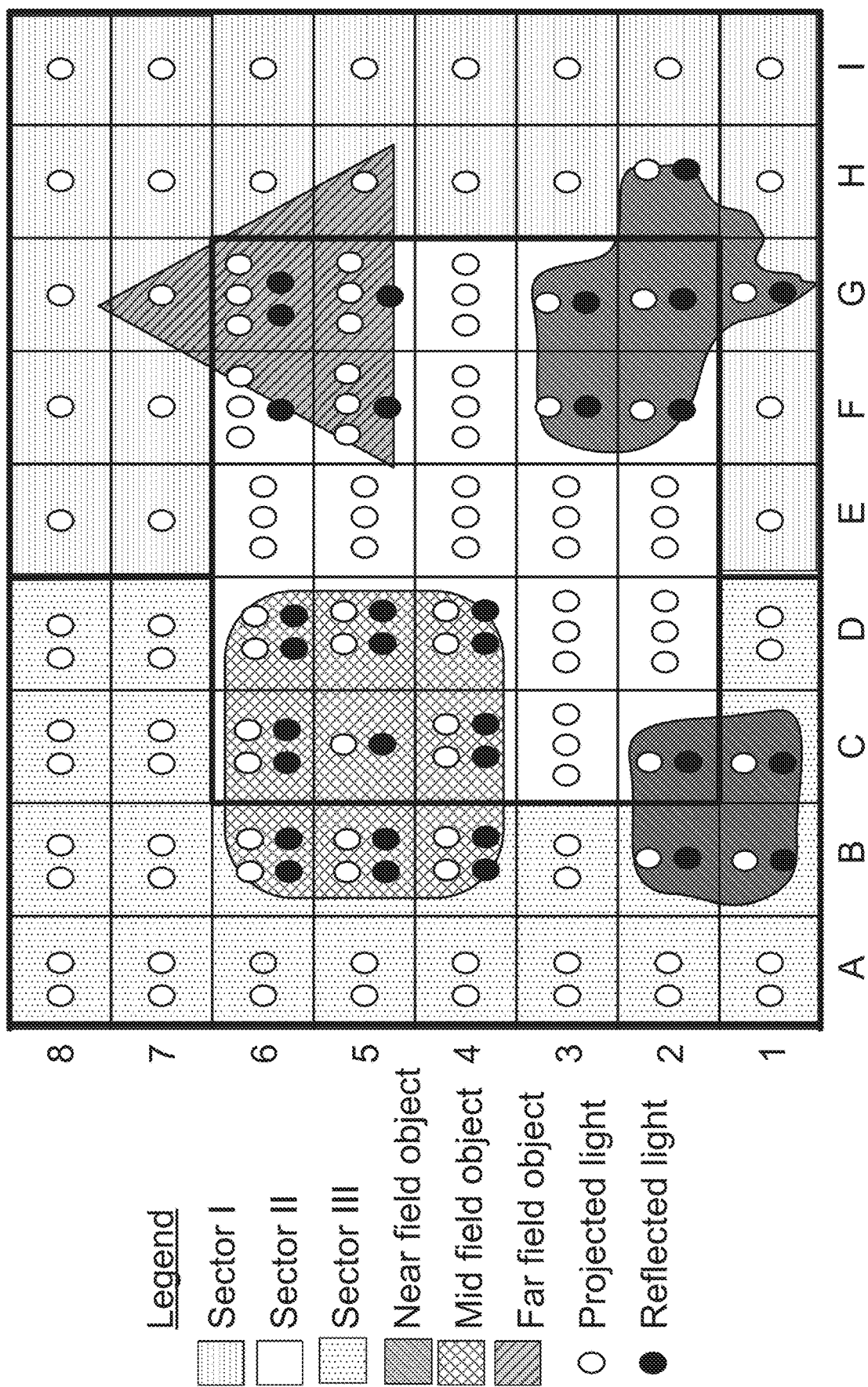
FIG. 5C is a diagram illustrating the actual light emission projected towards a field of view and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and FIG. 5C is a diagram illustrating the actual light emission projected towards the field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.
b. Energy profile of the subsequent emission.
c. A number of light-pulse-repetition per frame.
d. Light modulation characteristics such as duration, rate, peak, average power, and pulse shape.
e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined after each pulse emission, or after a number of pulse emissions.

FIG. 5B illustrates three examples of emission schemes in a single frame-time for field of view 120. Consistent with embodiments of the present disclosure, at least one processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle; (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For example, in at least some regions, detection of object at a first distance (e.g. a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
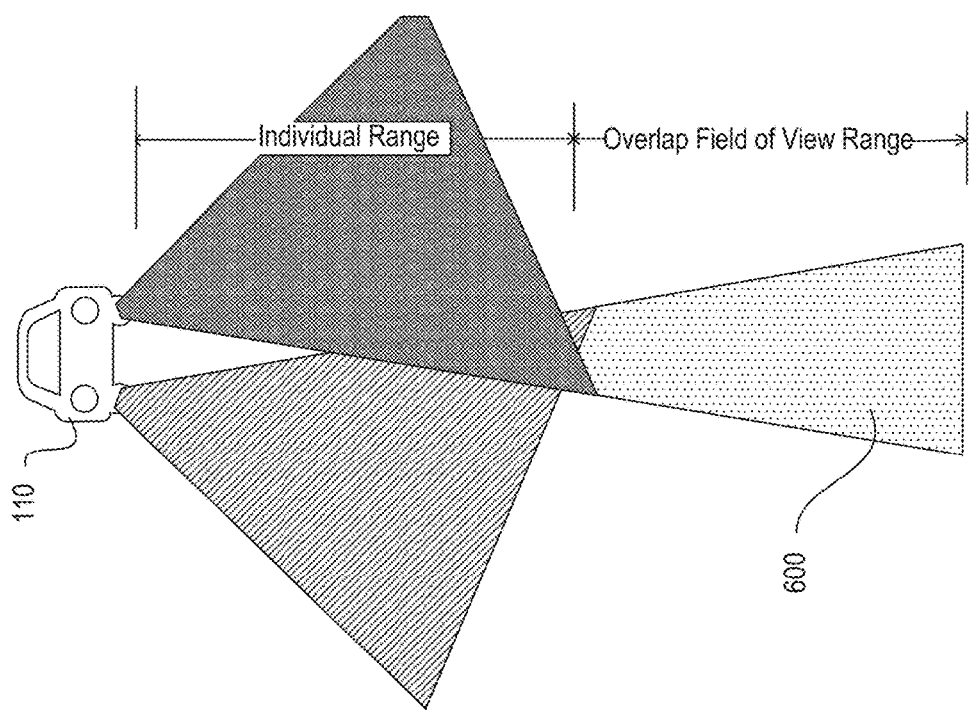
FIGS. 6A, 6B, and 6C are diagrams illustrating a first example implementation consistent with some embodiments of the present disclosure.
Figure 6A:
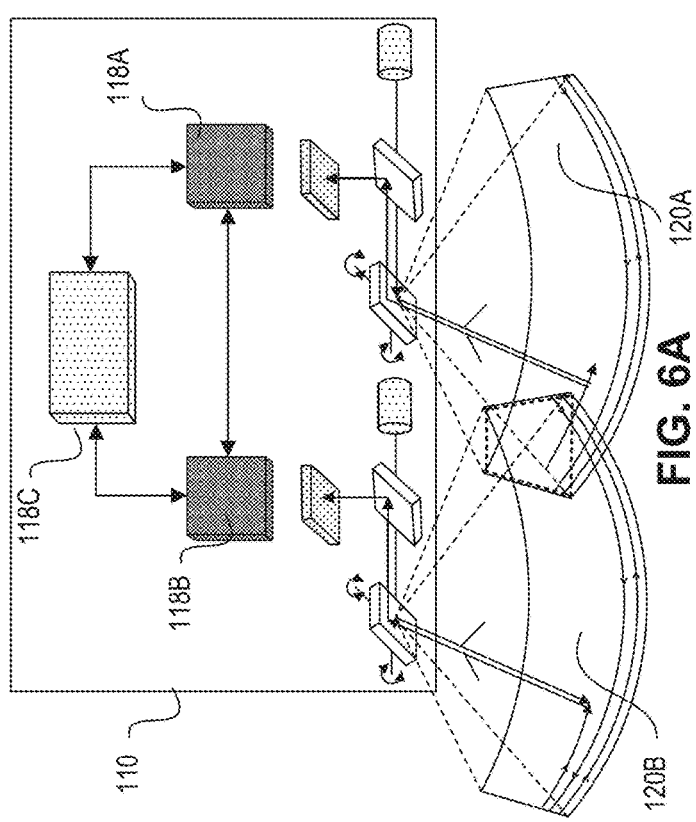
Figure 6B:
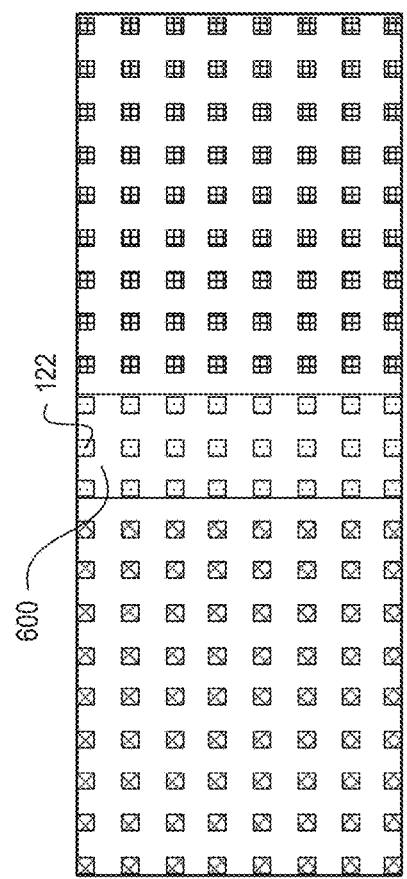

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range, and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times, even when the object's reflectivity may be less than 50% (e.g., less than 20%, less than 10%, or less than 5%). In addition, LIDAR system 100 may have a less than 1% false alarm rate. In one embodiment, light projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
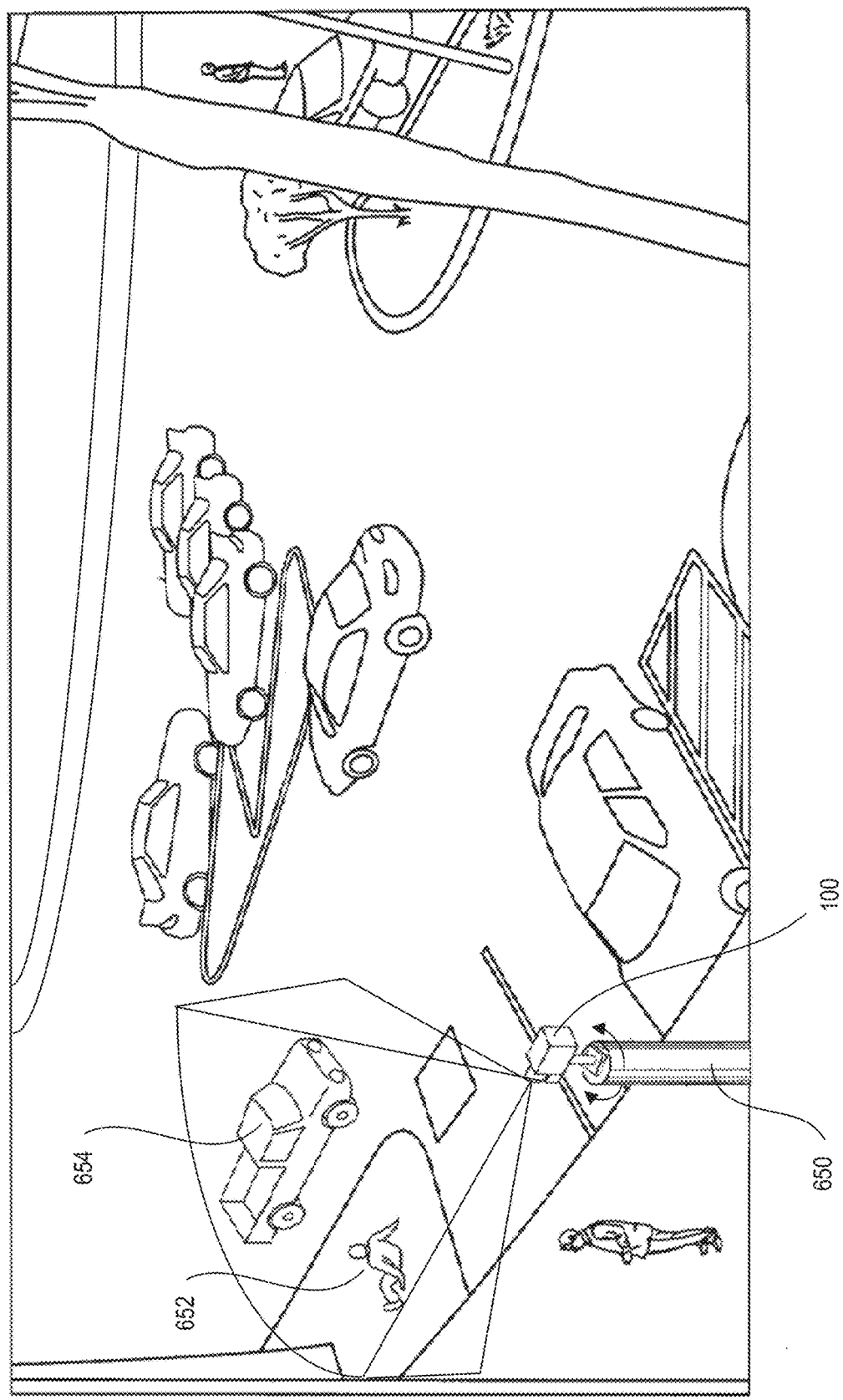
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanism for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electro-optical systems, other optical systems, etc.—whichever is applicable). Also, while system 100 is described relative to an exemplary vehicle-based LIDAR platform, system 100, any of its components, and any of the processes described herein may be applicable to LIDAR systems disposed on other platform types. Likewise, the embodiments and processes disclosed below may be implemented on or by LIDAR systems (or other systems such as other electro-optical systems etc.) which are installed on systems disposed on platforms other than vehicles, or even regardless of any specific platform.

Example Implementation: Interlaced Scanning

In some cases, a LIDAR system field of view (FOV) may be scanned using a scan pattern including a series of scan lines, which are sequentially scanned during each LIDAR FOV frame capture. Such sequential scans may be suitable for a variety of situations, but in some cases may lead to certain detection ambiguities. For example, in some cases, sequential scanning of scan lines of a LIDAR FOV scan pattern may provide insufficient information for determining whether reflections signals have been received from a moving or stationary object.

Figure 7:
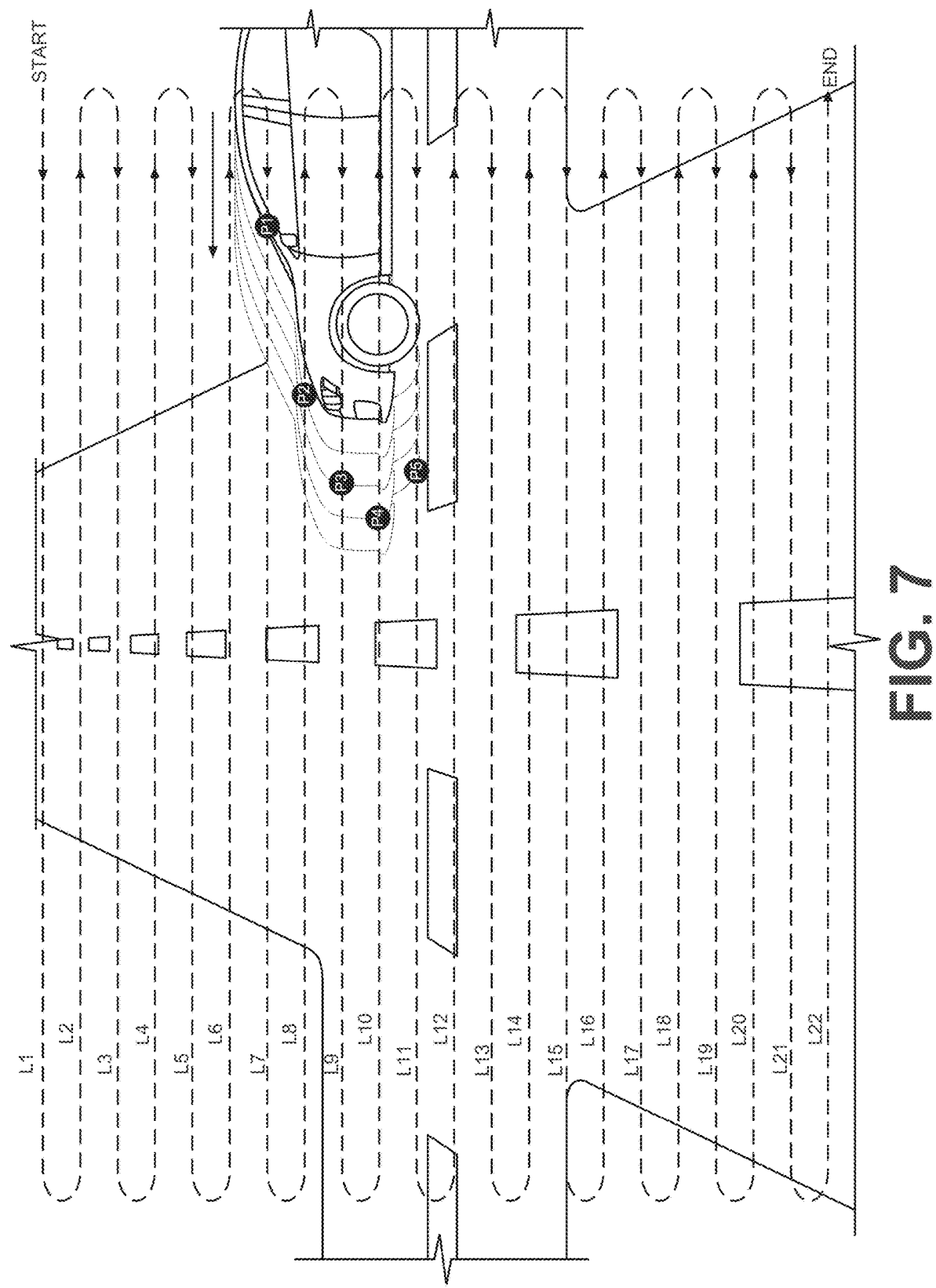
FIGS. 7 and 8 are images showing patterns for non-interlaced scanning for scanning a moving and stationary vehicle, respectively.
Figure 8:
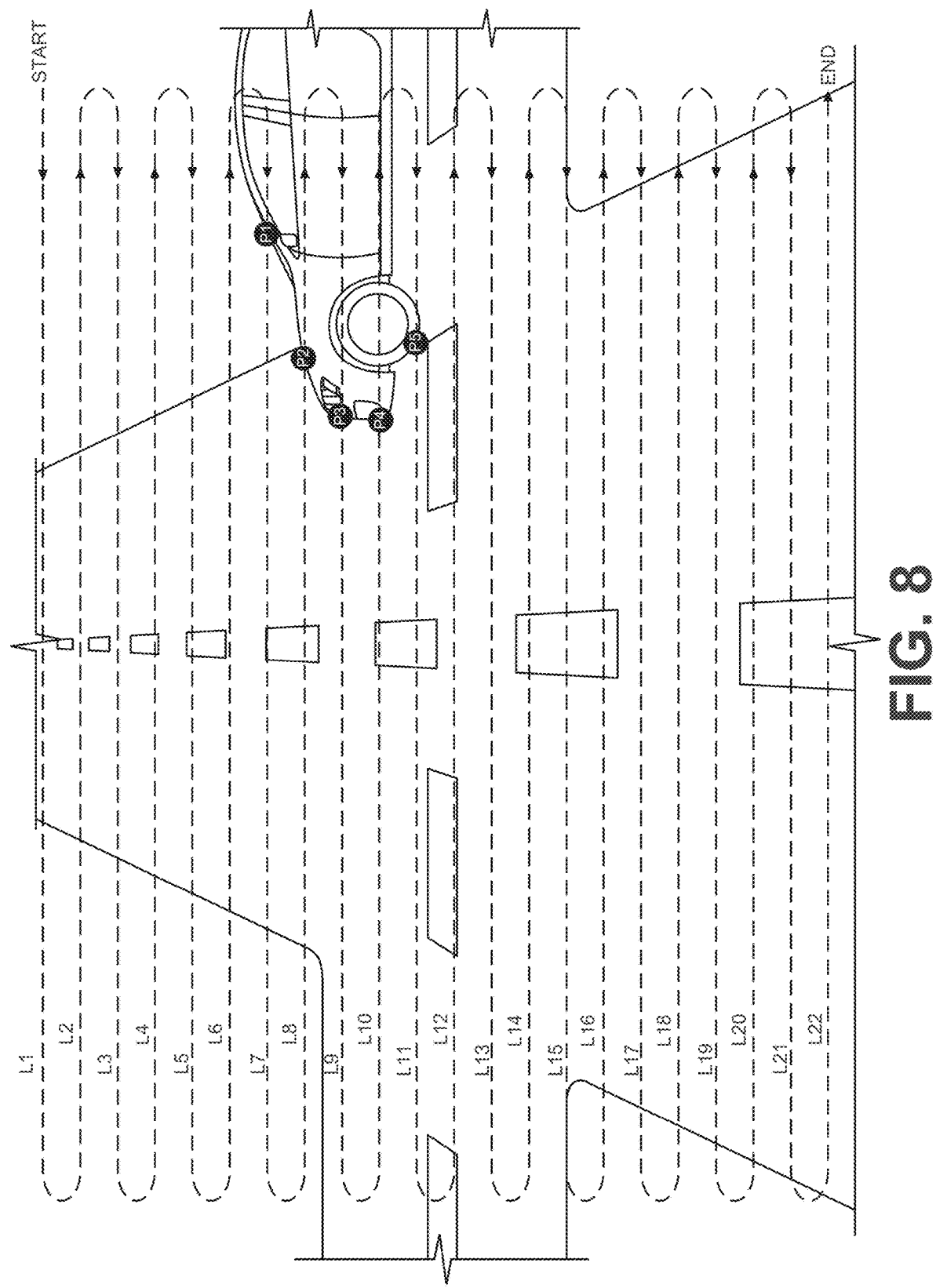

FIG. 7 illustrates a sequential scan of a vehicle in the LIDAR FOV moving from right to left. FIG. 8 illustrates a sequential scan of the same vehicle of FIG. 7, but the vehicle is stationary. Points P1 to P5 for both FIGS. 7 and 8 represent potential locations of reflection points at which a forward edge of the vehicle is detected as the FOV is scanned. Comparing the reflection pattern of points P1 to P5 in FIGS. 7 and 8, despite the fact that the vehicle is moving in the FIG. 7 example and stationary in the FIG. 8 example, the pattern of points P1 to P5 of FIG. 7 is similar to the pattern of points P1 to P5 of FIG. 8. Therefore, with a sequential scan of the vehicle, there may be an ambiguity determining whether a pattern of points in a point cloud is representative of an actual shape of an object or whether at least some portion of the pattern of points is attributable to object motion.

The examples of FIGS. 7 and 8 represent scenarios in which lateral motion is featured. In other scenarios, however, relative longitudinal motion may exist between a host vehicle and an object in the LIDAR FOV. In such cases, and similar to the lateral velocity examples of FIGS. 7 and 8, certain ambiguities may arise in longitudinal velocity situations regarding whether points in a point cloud are attributable to object shape or to object motion.

In some cases, these types of ambiguities may be resolved by tracking like objects across multiple LIDAR scan frames. Such tracking, however, can be challenging. For example, conclusively determining that a certain detected object representation in a first point cloud corresponds to another detected object representation in a subsequently generated point cloud is non-trivial and may require complex algorithms, complex training of machine learning systems over multiple time-distributed scan frames, etc. The analysis is made more complicated when there is relative motion, lateral and/or horizontal, between the host vehicle and the detected objects represented in a series of point clouds.

Further, in many cases, there may be insufficient time to perform a multi-frame analysis to determine whether a detected object is in motion or to confirm the motion characteristics of a detected object. As one example, there may be a situation wherein a host vehicle is following behind a first target vehicle, and both the host vehicle and the first target vehicle are approaching a second target vehicle, the second target vehicle may be completely occluded by the first target vehicle, and therefore not detected by the host vehicle. As the first target vehicle moves laterally (e.g., to pass the second target vehicle), the second target vehicle may be detected by the LIDAR system of the host vehicle. In this and similar scenarios, there is a need for systems of the host vehicle to quickly ascertain the motion characteristics of the second target vehicle—e.g., whether the second target vehicle is stationary, moving more slowly than the host vehicle, moving near to the same speed as the host vehicle, moving faster than the host vehicle, etc. Moreover, there is a need for this information as quickly as possible, as the host vehicle may be required to brake, take an evasive maneuver, etc.

The initial occlusion of the second target vehicle, however, may increase the difficulty associated with detecting a velocity of the second target vehicle. For example, once the second target vehicle is no longer occluded by the first target vehicle, a shape-based velocity detection technique may be used to estimate the velocity of the second target vehicle (e.g., based on a change from one FOV scan frame to the next in one or more dimensions of the shape associated with a point cloud representation of the second target vehicle). In typical situations, however, one or more seconds may elapse from when the second target vehicle is first detected until a shape based velocity estimate may be accomplished. At a relative velocity of 130 kph (e.g., a closing velocity in a situation where the host vehicle is driving at a highway speed while the second target vehicle is stationary), the host vehicle will have traveled about 43.3 meters in 1.2 seconds, which can significantly increase a potential collision risk. In such situations, for example, it may be desirable to reduce the amount of time needed to accurately predict the velocity of newly detected objects, including those that were previously occluded relative to the LIDAR system of a host vehicle. For example, it may be desirable to make a velocity determination of a newly detected object based on no more than a single LIDAR FOV frame scan.

Figure 10A:
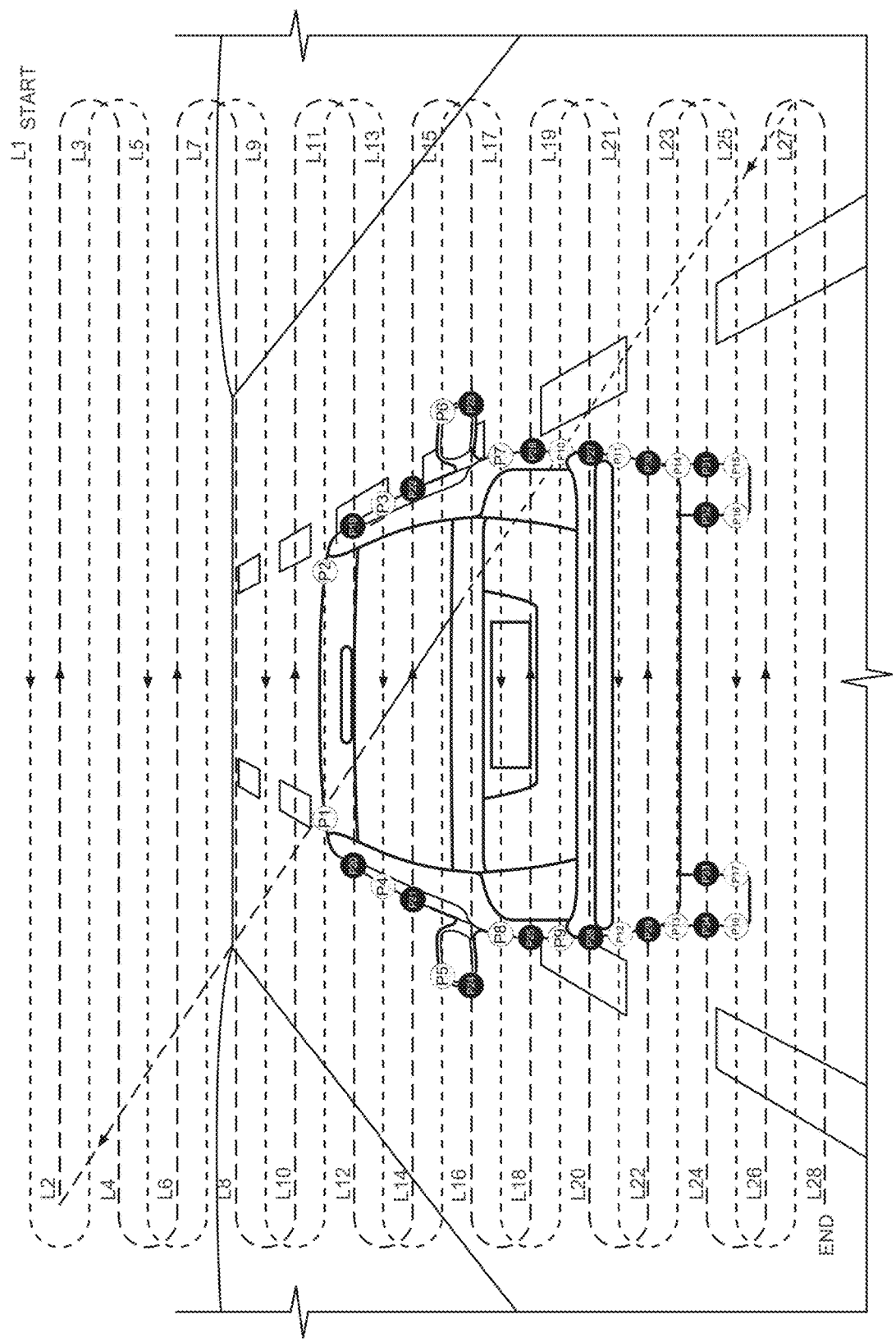
FIGS. 10A, 10B, 10C and 10D are images showing scanning patterns for scanning an object, consistent with some disclosed embodiments.

To address these challenges, the presently disclosed embodiments may employ a scan pattern including two or more series of interlaced scan lines. The presently disclosed embodiments may further include techniques for determining object motion based on a single scan of the LIDAR FOV and analysis of a single resulting point cloud. For example, if a single LIDAR FOV frame scan includes X scan lines scanned at a frame capture rate of Y FPS, rather than scanning all X lines sequentially, the X number of scan lines may be scanned in two or more groups. For example, FIG. 10A diagrammatically illustrates an interlaced FOV scan pattern relative to the LIDAR FOV in which a first group of scan lines (L1, L3, . . . L27) are scanned before a second group of scan lines (L2, L4, . . . L28). That is, in the FIG. 10A example, the odd indexed lines 1, 3, 5, 7 . . . 27 are scanned in a first group, and the even indexed lines 2, 4, 6, 8 . . . 28 are scanned in a second group after the first group. In this way, the second group of scan lines are interleaved with the first group of scan lines, but are not scanned until the first group of scan lines is fully scanned.

In one example, assuming a LIDAR FOV frame scan rate of 15 FPS and 22 scan lines per frame, completing a scan of each individual scan line will require about 3 milliseconds. During this time and assuming a vehicle is moving at a velocity of 130 kph, the vehicle will move by about 10.8 cm between corresponding points on each adjacent scan line. Thus, even at a relatively high velocity of 130 kph, it may be difficult to determine whether a 10.8 cm difference in an object leading edge location, from one scan line to the next, is attributable to object motion or object shape.

By implementing an interlaced scanning pattern, the 15 FPS frame capture rate is effectively divided into half-frame captures for each of the first and second groups of scan lines. The first group may be scanned during a first 33 millisecond window (e.g., the first half of the 15 FPS full frame capture rate), and the second group may be scanned during a second, subsequent 33 millisecond window (e.g., the second half of the 15 FPS full frame capture rate). In this way and for this particular example, rather than only 3 milliseconds separating adjacent scan lines in a full frame capture (e.g., using a non-interlaced scan pattern), 33 milliseconds will separate adjacent scan lines in the full frame capture. As a result, and returning to the example in which a detected vehicle moves at a lateral velocity of 130 kph, the position of the vehicle will have changed by 1.19 meters during 33 milliseconds, which is much greater than the 10.8 cm position change associated with the non-interlaced scan pattern example. A 1.19 meter difference in lateral position between object leading edge points associated with adjacent scan lines is much less attributable to variations in object shape and, as a result, ambiguities that may exist in velocity determinations based on a non-interlaced scan patterns can be significantly reduced. In addition, interlaced scanning is an intra-frame velocity detection method which, when compared to inter-frame velocity detection methods such as shape-based velocity detection, may reduce the amount of time required to determine the velocity of an object, and therefore the distance traveled by the object. For example, assuming a 15 FPS frame capture rate, scanning a single frame of an object moving at 130 kph with interlaced scanning would be completed in 0.067 seconds, in which the object would have traveled around 2.4 m. Therefore, in this particular situation, interlaced scanning would have at least a 2.4 m advantage compared to inter-frame detection methods which would require at least 2 frames, and therefore at least 4.8 m to determine the velocity of the object.

The described interlaced scanning technique may provide several potential benefits, one of which includes resolving ambiguities related to object motion versus shape as discussed above. In addition, interlaced scanning may improve the accuracy of calculating an orientation of a field of view. Once a field of view is scanned, the orientation of the field of view may be determined by the road plane. If the road plane is measured at t1 and subsequently at t2 using the interlaced technique as discussed above, the road plane can be calculated based on the reflection signals received at t1 and t2. If the difference between t1 and t2 is large, the road plane measured as an average of t1 and t2 can provide a more accurate representation of the actual orientation than a non-interlaced scan. Further still, as the point cloud features that enable a determination of whether a detected object is moving are present in a single point cloud associated with a single scan of the LIDAR FOV, the described interlaced scanning technique enables determination of object motion characteristics based on a single scan of the LIDAR FOV. In other words, a need for complicated, multi-frame object tracking and analysis in order to determine motion characteristics of detected objects can be avoided using the presently disclosed systems and techniques, which are discussed in further detail in the sections below.

Figure 9:
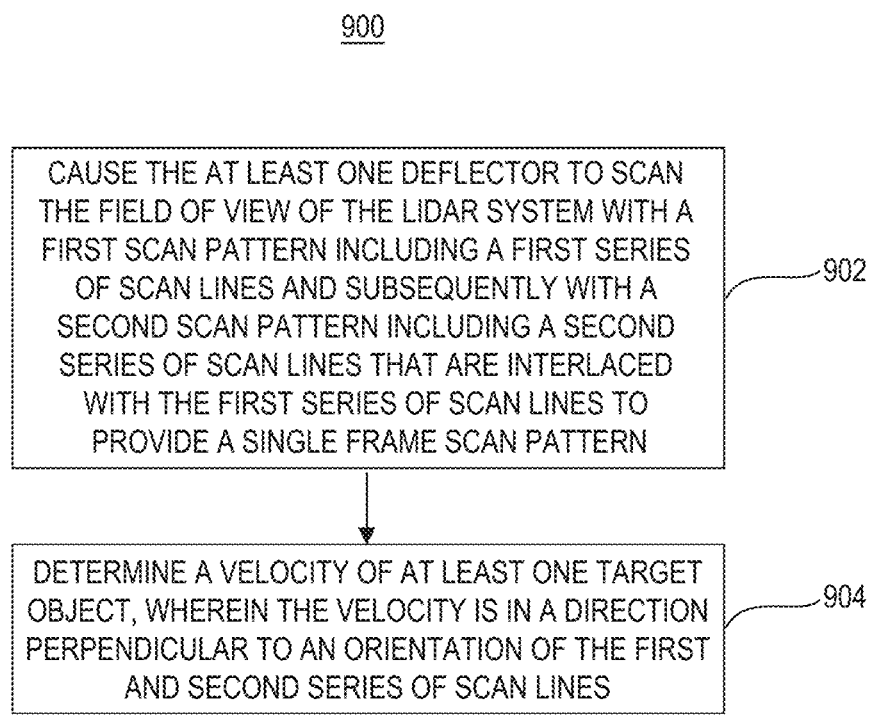
FIG. 9 is a flow chart of an example method for interlaced scanning consistent with some embodiments of the present disclosure.

FIG. 9 outlines an example method 900 for interlaced scanning consistent with this disclosure. Method 900 may be executed by at least one processor, such as a processor of LIDAR system 100 (e.g., at least one processor 118 of processing unit 108 in the example of FIG. 1A, two processors 118 of processing unit 108 of FIG. 2A, or the like). It is noted that method 700 may implemented by multiple types of scanning LIDAR systems, and not necessarily by LIDAR system 100.

At step 902, the at least one processor causes at least one deflector to scan a field of view of the LIDAR system with a first deflector scan pattern including a first series of scan lines and subsequently with a second deflector scan pattern including a second series of scan lines that are interlaced with the first series of scan lines to provide a single frame scan pattern. For example, FIG. 10A illustrates an example of a scan of a field of view of the LIDAR system. A scanning pattern may start at the top right corner labeled "START" and end at the bottom left corner labeled "END" and may include a first series of scan lines including odd lines L1, L3, L5, . . . L27 and a second series of scan lines including even lines L2, L4, L6, . . . L28 that are interlaced with the first series of scan lines. It is noted that the scanning pattern may start and end at any point in the field of view and is not necessarily limited to the scanning pattern as shown. In addition, the scanning pattern may include any number of scan lines and is not necessarily limited to the scanning pattern as shown.

At step 904, the at least one processor determines a velocity of at least one target object, wherein the velocity is in a direction perpendicular to an orientation of the first and second series of scan lines. For example, the at least one processor may analyze reflection signals associated with the single frame scan pattern to determine whether at least one target object present in the field of view of the LIDAR system is moving. At least one sensor, such as sensor 116, of the LIDAR system may be configured to receive light reflected from objects in field of view 120 to generate outputs relating to the received light reflections. Time of flight calculations may then be performed to determine distances to various objects in the FOV, and a point cloud of distance values may be generated for each scan of the FOV. For example, by comparing the information received from the first set of scan lines to the information received from the second set of scan lines, a change in velocity of the target object, such as a vehicle, may be determined based on a single scan of the FOV.

While various orientations of the scan lines of the FOV scan pattern may be used, in some embodiments, the first and second series of scan lines may be oriented horizontally, and the at least one processor may further determine a velocity of at least one target object based on a plurality of return signals resulting from the first deflector scan pattern and the second deflector scan pattern. In one example, a longitudinal velocity may be determined for the target object. FIG. 10A illustrates an example of a scan of a field of view of the LIDAR system, wherein the scan is comprised of 28 horizontal scan lines. In the particular example of FIG. 10A, the vehicle (center) is maintaining a constant longitudinal velocity throughout the deflector scan. This can be determined based on the points at which the edges of the vehicle are detected with the first and second deflector patterns, which is depicted in FIG. 10A by points P1 to P18 and points P19 to P34, respectively.

Figure 10B:
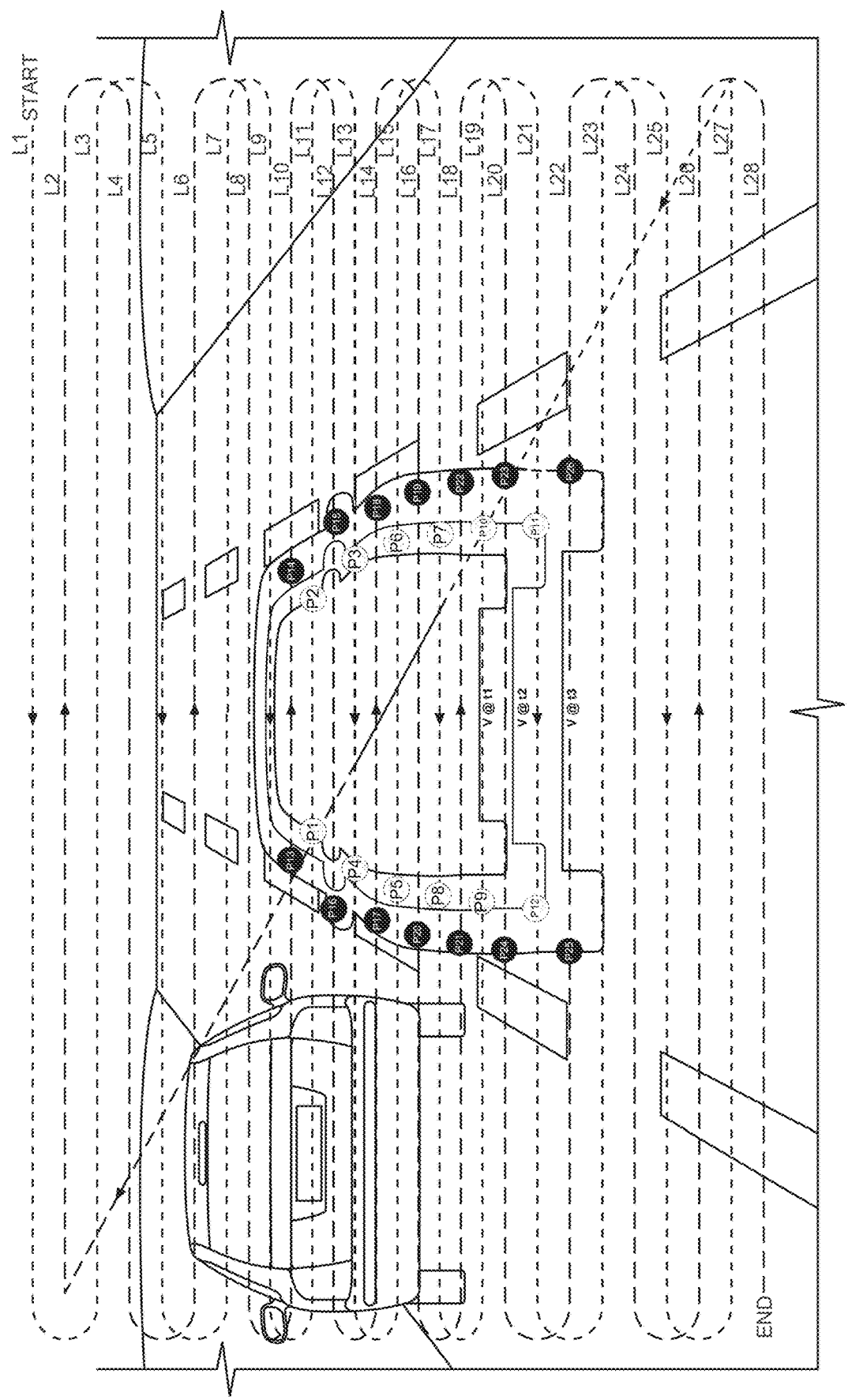

In another example, a vehicle may either increase or decrease in longitudinal velocity as the deflector scans the FOV of the LIDAR system with the first and second deflector scan patterns. FIG. 10B illustrates an example of a scan of a field of view of the LIDAR system, wherein the scan is comprised of 28 horizontal scan lines. In FIG. 10B, three outlines of a vehicle (center) are depicted wherein the vehicle is first detected when located at the inner most outline (i.e., V@t1) and moves at a negative relative longitudinal velocity to end up at the outer most outline (i.e., V@t3). Points P1 to P26 indicate the points at which the edges of the vehicle are detected throughout the scanning process. With the first series of scan lines including odd lines starting at L1, the edges of the vehicle are detected at points P1 to P12, and with the second series of scan lines including even lines starting at L2, the edges of the vehicle are detected at points P13 to P26.

Based on a comparison of points P1 to P12 and points P13 to P26, longitudinal motion (and motion characteristics, such as relative velocity) can be detected/determined. For example, assuming the host vehicle of the LIDAR system is moving at a constant velocity, the LIDAR system may detect that the vehicle in the FOV is moving at a negative relative longitudinal velocity due to a comparison of the spatial locations in the point cloud of object edge points detected in adjacent scan lines. For example, analysis of spatial differences between pairs of points, such as P1, P13; P4, P16; P3, P15; etc. can assist in determining that the detected vehicle is moving relative to the host vehicle (e.g., because the zigzag pattern of points P2, P14, P3, P15, P6, P18, etc. is much more likely associated with vehicle motion than vehicle shape) and can be used to determine motion characteristics (e.g., the magnitude and direction of relative motion between the host vehicle and detected vehicle determined based on the spatial arrangement of point cloud points and known times between scan lines). In some embodiments, determining motion characteristics may include determining a relative velocity profile from when the vehicle is first detected (e.g., at time t1 within the single frame scan) to when the vehicle is last detected (e.g., at time t3 within the single frame scan). For example, the LIDAR system may use spatial location information for selected points in the point cloud to determine an increase or decrease in a relative distance between the host vehicle and the target vehicle during certain phases of the LIDAR FOV scan. Factoring in the time information available for each of the point cloud points, the system can determine relative velocity between the host and target vehicles.

Figure 10C:
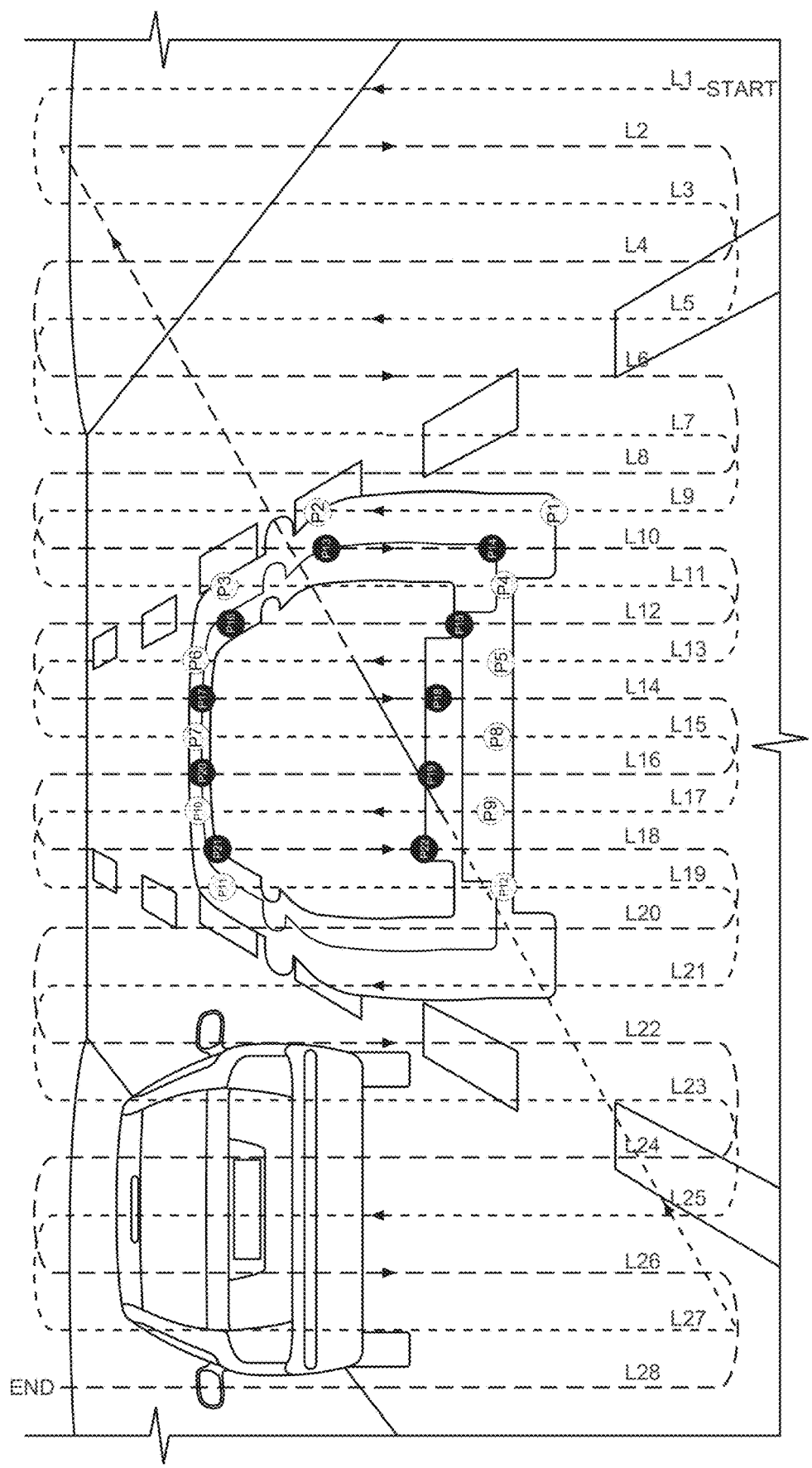

In another example (e.g., where the first and second series of scan lines are oriented vertically), the at least one processor may determine both a lateral and a longitudinal velocity of at least one target object based on a plurality of return signals resulting from the first deflector scan pattern and the second deflector scan pattern. It should be noted that a deflector scan pattern refers to a pattern of motion associated with the deflector itself in order to scan one or more laser beams relative to the LIDAR FOV according to an FOV scan pattern. By way of example, FIG. 10C illustrates an example of an FOV scan pattern, wherein the scan is comprised of 28 vertical scan lines. In FIG. 10C, the vehicle (center) is moving at a positive longitudinal velocity relative to the host vehicle, but maintaining zero lateral velocity relative to the host vehicle. This can be determined based on the spatial locations and timing information associated with points P1 to P22, for example, using techniques similar to those discussed above.

Figure 10D:
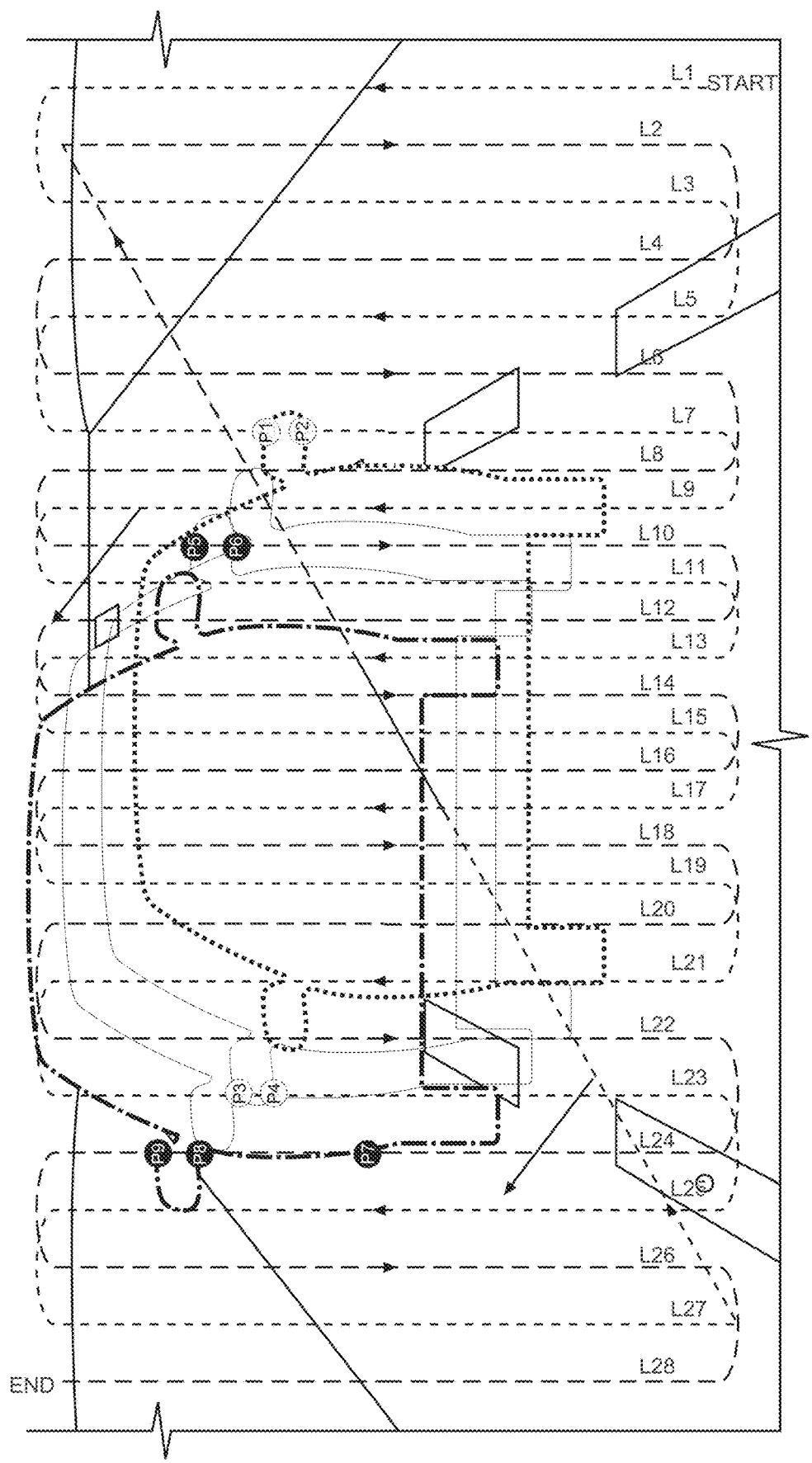

In another example, a target vehicle may exhibit both lateral and longitudinal velocity relative to the host vehicle. FIG. 10D illustrates an example of a scan of a field of view of the LIDAR system, wherein the scan is comprised of 28 vertical scan lines. In FIG. 10D, the target vehicle exhibits both lateral and longitudinal velocity relative to the host vehicle, which can be determined based on the spatial locations of certain points (e.g., points associated with edges, surfaces, or other features of the target object) between the groups of interlaced scan lines. For example, as the deflector scans the FOV of the LIDAR system, the target vehicle of FIG. 10D moves both longitudinally and laterally relative to the host vehicle. As the target vehicle moves, the first series of scan lines will overlap with the target vehicle followed by second series of scan lines. Point cloud points may then be generated from any spatial location along the first and second series of scan lines that overlap with the target vehicle. The actual locations and density will depend on the laser pulse rate, deflector scanning rate, etc. For clarity of discussion, only a few points are illustrated with respect to certain scan lines. It should be noted, however, that scan lines may be associated with much higher numbers of point cloud points indicating detection of objects in the field of view.

In the FIG. 10D example, points P1 to P4 are examples of points detected from the first series of scan lines (odd indexed lines) while points P5 to P9 are examples of points detected based on the second series of scan lines (even indexed lines). As shown, a vehicle moving with a positive longitudinal and lateral velocity results in points that have a trend that shows the general movement of the vehicle. For example, points P1 and P2 correspond to points P5 and P6 as the target vehicle moves both to the left and away from the host vehicle. Similarly, points P3 and P4 correspond to points P9 and P8 as the target vehicle continues to move to the left and away from the host vehicle. Relative motion and associated motion characteristics can be determined by tracking or comparing the spatial locations of point cloud points generated based on the different sets of interlaced scan lines as the target object moves relative to the host vehicle.

Figure 11:
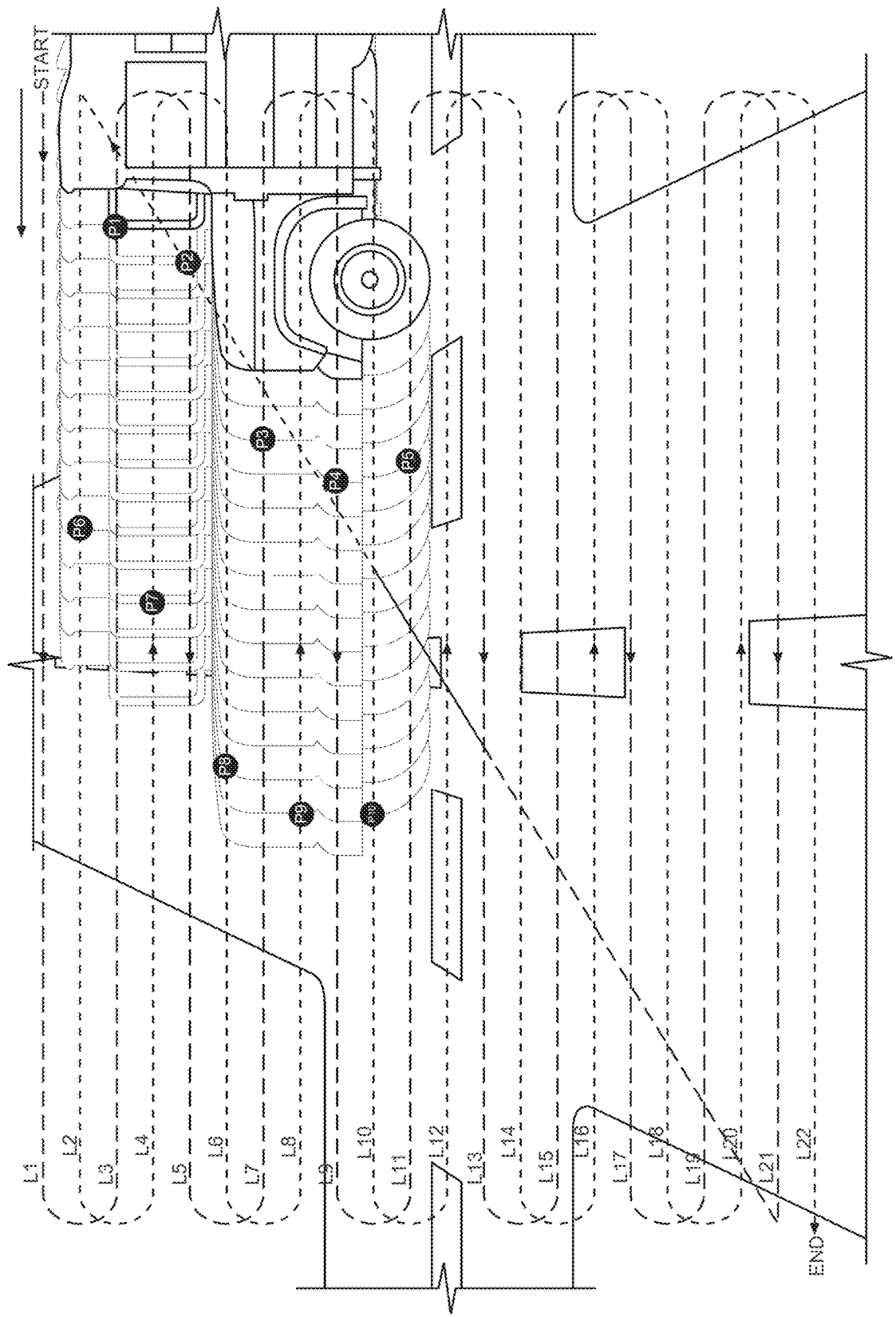
FIG. 11 is an image illustrating lateral motion detected by horizontal interlaced scanning consistent with some embodiments of the present disclosure.

FIG. 11 represents another example in which lateral velocity may be determined. In the example of FIG. 11, an interlaced scan pattern is comprised of 22 horizontal scan lines. Points P1 to P5 are examples of points detected from a first group of scan lines while points P6 to P10 are examples of points detected from a second group of scan lines. Based on a comparison of one or more selected points from among P1 to P5 and one or more selected points from among P6 to P10, a lateral motion and characteristics of the lateral motion (e.g., a magnitude of the lateral motion) can be detected. For example, the spatial variation between points P3, P9, and P4, which all correspond to the substantially vertical front edge of the illustrated bus indicates that the bus is in motion, not that the bus exhibits a shape that extends from point P3 to point P9 and back to point P4. Further, determining the spatial difference in translation from point P3 to point P9, together with the time between when point P3 was generated during the first group of scan lines and when point P9 was generated during the second group of scan lines, enables determination of the relative lateral velocity of the bus and the host vehicle.

Figure 12:
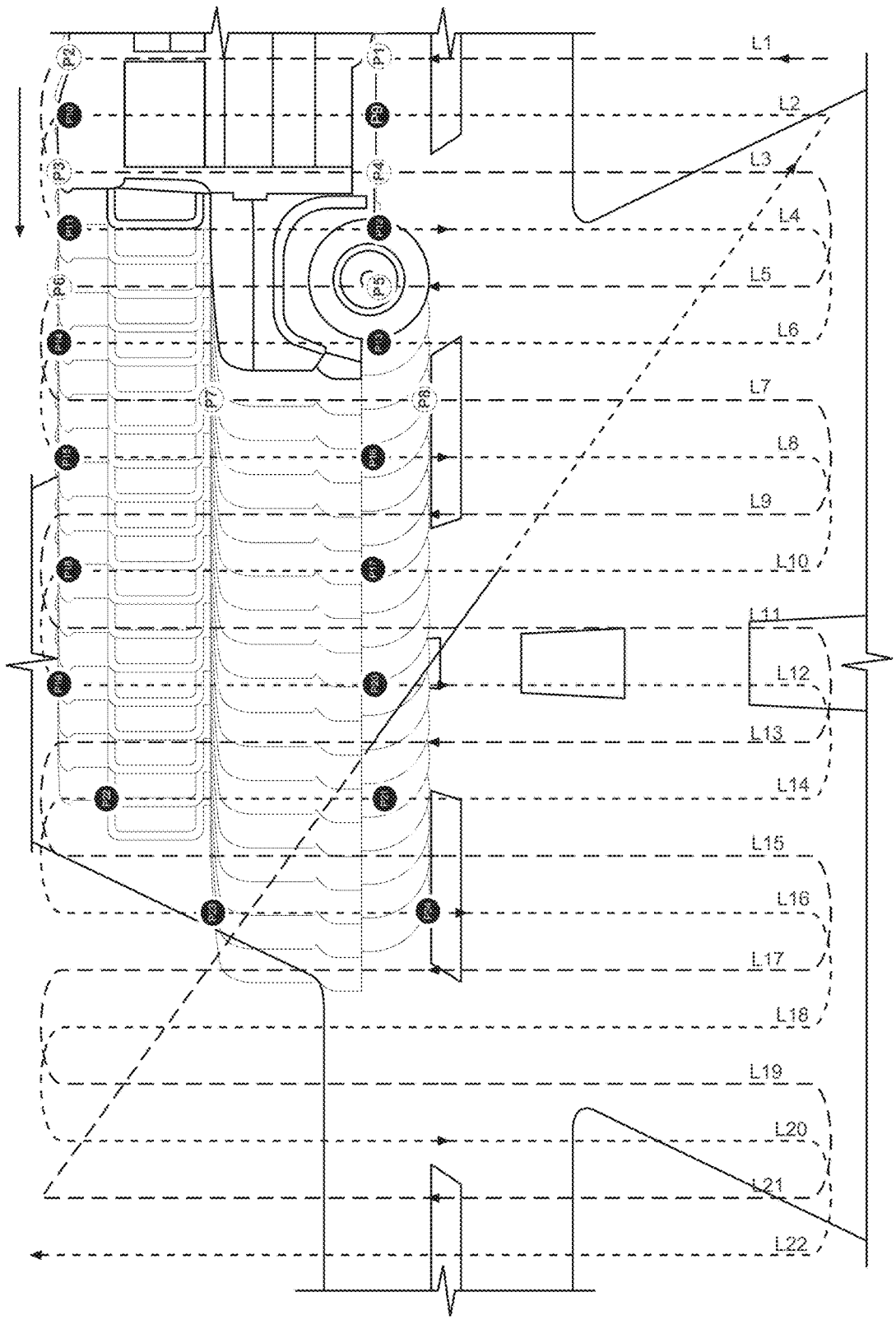
FIG. 12 is an image illustrating lateral motion detected by vertical interlaced scanning consistent with some embodiments of the present disclosure.

In some embodiments, an interlaced scan pattern comprised of vertical scan lines may be used for determining a velocity, including a lateral velocity. For example, FIG. 12 represents an example in which lateral velocity may be determined. In FIG. 12, an interlaced scan pattern is comprised of 22 vertical scan lines. Points P1 to P8 are examples of points detected from a first group of scan lines while points P9 to P24 are examples of points detected from a second group of scan lines. In non-interlaced scanning, implementing a vertical scan direction would result in several points on an edge that are close to one another both in space and time. With interlaced scanning, implementing a vertical scan direction would result in the points being close together in space, but far in time from a previous scan line, which may reduce rolling shutter effects where there is an offset in measurements along the edges, as shown in FIG. 11. Rolling shutter effects may be more pronounced when the scan direction is in the same direction as the motion of the vehicle. By scanning in a direction perpendicular to the motion of the vehicle, the rolling shutter will be reduced, and the vertically oriented edges will have multiple point captured within a shorter time span, thereby increasing accuracy and reliability in determining a lateral velocity compared to horizontal scanning. For example, points P7, P8, P23 and P24 are all points corresponding to the substantially vertical front edge of the illustrated bus in FIG. 12. Points P7 and P8 are points scanned at t0 and points P23 and P24 are points scanned at t1, wherein t1 is a point in time after t0. By comparing points P7 and P8 to P23 and P24, the LIDAR system can detect that the vehicle moved and determine a distance that the vehicle moved from t0 to t1 to determine a lateral velocity.

As described above, use of an interlaced scan pattern can enable confirmation within a single FOV frame scan of whether a detected object is moving relative to a LIDAR system (e.g., a LIDAR system deployed on a host vehicle). Additionally, the velocity of the moving object may be determined based on reflections signals received during a single FOV frame scan. For example, once it has been determined that a detected object is moving (e.g., based on the spatial disparity between reflections signals from a first series of scan lines and reflections signals from a second series of scan lines interlaced with the first series, or alternatively, from an absence of signals from a first or second series of scan lines), a velocity of the object may be calculated. Such a velocity calculation may rely upon the spatial locations of various reflections signals acquired over one or multiple different scan lines in a single FOV frame scan. In one example, reflections signals may be acquired from a common location or region of a detected object (e.g., a leading edge of a car bumper, top edge of a windscreen, door handle, etc) over multiple scan lines. In one specific case, a leading edge of a vehicle tire may be detected during scan line L9 (FIG. 11) associated with a first series of scan lines of the single FOV frame scan. The same leading edge of the vehicle tire may be detected during scan line L16 (FIG. 11) associated with a second series of scan lines interlaced with the first series of scan lines. Because the LIDAR system provides range information for each received reflection signal (based on time of flight calculations), the distance from the LIDAR system to the tire at scan line L9 will be known. Similarly, the distance from the LIDAR system to the tire at scan line L9 will be known. The angle between scan lines L9 and L16 is known as well, based on the angular segment of the known angular FOV width located between scan lines L9 and L16. This information allows for determination of the actual distance change of the vehicle between scan lines L9 and L16. Finally, as the scan rate is also known, the time between scan lines L9 and L16 can be determined. With the time between scan lines L9 and L16, and the distance traveled by the vehicle between scan lines L9 and L16, the velocity of the detected object (e.g., the vehicle of FIG. 11) may be calculated. And this calculation can be based solely on information gathered during a single FOV frame scan.

Using the technique described above, one or more aspects of a LIDAR generated point cloud may be adjusted. For example, in some cases, at least one aspect of a representation of at least one detected object in the point cloud may be adjusted based on a calculated velocity of the at least one detected object. In some examples, multiple objects may be detected based on a single frame scan of the LIDAR FOV, and for each of these multiple objects a corresponding velocity may be determined using the technique outlined above. These velocities may be used to adjust the object representations in a point cloud to remove the effects of object velocity, for example. That is, because each FOV frame scan requires a finite amount of time to complete, and because one or more objects in the FOV may move relative to the LIDAR system during that time, the resulting point cloud generate will exhibit certain motion-induced distortions. These distortions are similar to distortions resulting from a camera having a rolling shutter. If the velocities of the detected objects are known, however, the point cloud associated with a LIDAR FOV frame scan may be adjusted to at least partially remove these types of motion-based distortions. For example, using the determined velocity for at least one detected moving object, the representation in the point cloud of that object (e.g., the set of points generated based on reflections signals received from the moving object) may be warped to a particular time selected from within the scan duration of the LIDAR FOV frame scan. While any time may be selected, in some cases, the time may represent a midpoint in time of the frame scan. Points generated based on reflections signals acquired from the moving object before the selected time can be warped, e.g., in a direction of the object's motion to "catch up" to the selected time. Points generated based on reflections signals acquired from the moving object after the selected time can be warped, e.g., in a direction opposite to the object's motion to represent actual locations of the moving object at the selected time. The amount of warping may depend on various factors, such as the velocity of the object, the distance from the LIDAR system, etc.

The LIDAR system may include a plurality of configurations to implement the aforementioned techniques. In some embodiments, the LIDAR system may include at least one light source such as a solid-state laser, laser diode, a high power laser, or an alternative light source such as, a light emitting diode (LED)-based light source. As depicted in FIG. 2A, the light source (e.g., projecting unit 102) may include a single light source 112. In other cases, the light source may generate a plurality of laser light beams for projection toward a field of view of the LIDAR system. The plurality of beams may be generated by splitting a single generated laser beam into two or more beams. Alternatively, multiple laser sources (e.g., a laser array) may be included in the LIDAR system for generating a plurality of laser beams. For example, some embodiments may include 4, 8, 32, 64 laser sources, or any other desired number of laser sources. FIG. 2E diagrammatically represents one such example in which the LIDAR system includes an array of laser sources. Specifically, as depicted in FIG. 2E, the light source (e.g., projecting unit 102) may include an array of light sources 112A-112F. In some embodiments, the array of light sources may include a linear array of light sources controlled by processor 118 to sequentially project collimated laser beams. In some embodiments, some or all of the at least one light source 112 may project light concurrently. For example, the processor 118 may cause the array of light sources to simultaneously project light beams from a plurality of light sources 112.

In some embodiments, the LIDAR system may further include at least one deflector configured to scan light, such as the plurality of laser light beams emitted by the at least one light source, over a field of view of the LIDAR system. For example, as depicted in FIG. 2B, deflector 114 is configured to direct laser light 204 projected by light source 112 of projecting unit 102 toward field of view 120 for scanning. In some aspects, a scanning scheme may include at least one of a designation of portions within field of view 120 to be actively scanned as part of a scanning cycle and/or a deflecting plan for scanning unit 104 that defines for example, a deflection direction, frequency, and designating idle elements within a reflector array. In some embodiments, as depicted in FIG. 2A, the at least one deflector may comprise a first light deflector 114A for outbound light and a second light deflector 114B for inbound light. The deflectors may be part of a bi-static configuration of the LIDAR system wherein projected light exiting the LIDAR system and the reflected light entering the LIDAR system pass through substantially different optical paths. In some embodiments, the at least one deflector may also be configured to receive the laser light return signals reflected from the objects in the field of view. For example, as depicted in FIG. 2B, deflector 114 may be configured to direct the reflected light from objects in the field of view towards sensor 116. In some embodiments, the LIDAR system may further comprise at least one receiver to receive reflected light, wherein the receiver includes a monolithic multichannel receiver.

In some embodiments, a single laser source may be scanned over a LIDAR FOV using a deflector, such as a 2-D scanner. In a particular example (e.g., the example of FIG. 10B), a 2-D scanning mirror (e.g., MEMs mirror(s), biaxial mechanically rotated mirror, etc.) may be used to scan light from a single laser source over the illustrated scan pattern. As shown in this example, the horizontal scan lines need not be evenly spaced. For example, to scan certain regions of the LIDAR FOV, such as areas near the top and bottom of the FOV, a vertical tilt increment for the 2-D scanning mirror may be selected that is greater than a minimum available tilt increment. Nearer to the horizon, however, a smaller vertical tilt increment may be selected. Such an arrangement may result in higher resolution scanning in a region overlapping the horizon, which is typically a region of interest as it tends to include a high density of objects potentially relevant to host vehicle navigation.

In some embodiments, laser sources, whether included in the disclosed systems as a single laser source or in an array of laser sources, may include pulsed lasers having a wavelength of 860 nm-950 nm. In some cases, the laser sources may have a wavelength of about 905 nm. Multiple laser sources may be included in the laser array, and the array may be arranged in a 2-D pattern or a 1-D pattern. In some cases, the laser sources may be arranged in a 1-D configuration to provide a laser bar array including multiple (e.g., two or more) laser sources. The 2-D scanner may include any type of scanning mirror arrangement, including any of the scanners described in the sections above. In some cases, the 2-D scanner includes a MEMs mirror or an array of MEMs mirrors. In other cases, a single, relatively large mirror (e.g., about 20 mm×20 mm) may be used. In some cases, the mirror of the biaxial, 2-D scanning may be actuated using a mechanical arrangement (e.g., motor driven actuation, magnetic actuation, etc.) In some cases a combination of two or more 1-D scanners may be used to generate a 2-D scan. A detector may be configured similar to any of the detectors discussed in the sections above. For example, in some cases, the detector may include an array of sensors (e.g., a multichannel SiPM sensor array or SPAD array or an APD array). The detector may include an array of detector channels, SPADs, SIPMs, APDs, etc. In some cases, the detector may be arranged in a 1-D configuration.

In some embodiments, the laser source may include an array of laser sources (e.g., 16 laser sources) arranged in a 1-D array, each having a wavelength of about 905 nm. The light emitted from the laser sources may travel through various optical components associated with the optical path, including, e.g., lenses, collimators, etc. The 2-D scanner may include a 20×20 mm mirror capable of providing a 140 degree×44 degree FOV scanned at a frame scan rate of 20 Hz. The scanner may be configured to support a specific scan rate or a scan rate range between 5-50 Hz depending on the requirements of a specific application. The 16 emitted, pulsed light beams may be projected from the 2-D scanner toward the FOV. The reflected spots returned from the FOV may each have a size of about 0.07 degrees by 0.10 or 0.11 degrees. The vertical arrangement of the spots may depend on the configuration of the laser sources on the laser source array. For example, the amount of space between each laser source may result in corresponding spaces between the returned spots. The laser sources may have a vertical angular dimension of 0.1 degrees and may be spaced apart by about 0.2 degrees (i.e., a 2:1 ratio of open space to laser emitter). With 16 channels, the overall vertical pattern or "comb" of light beams projected toward the FOV may occupy an angular height of about 4.6 degrees.

Figure 13:
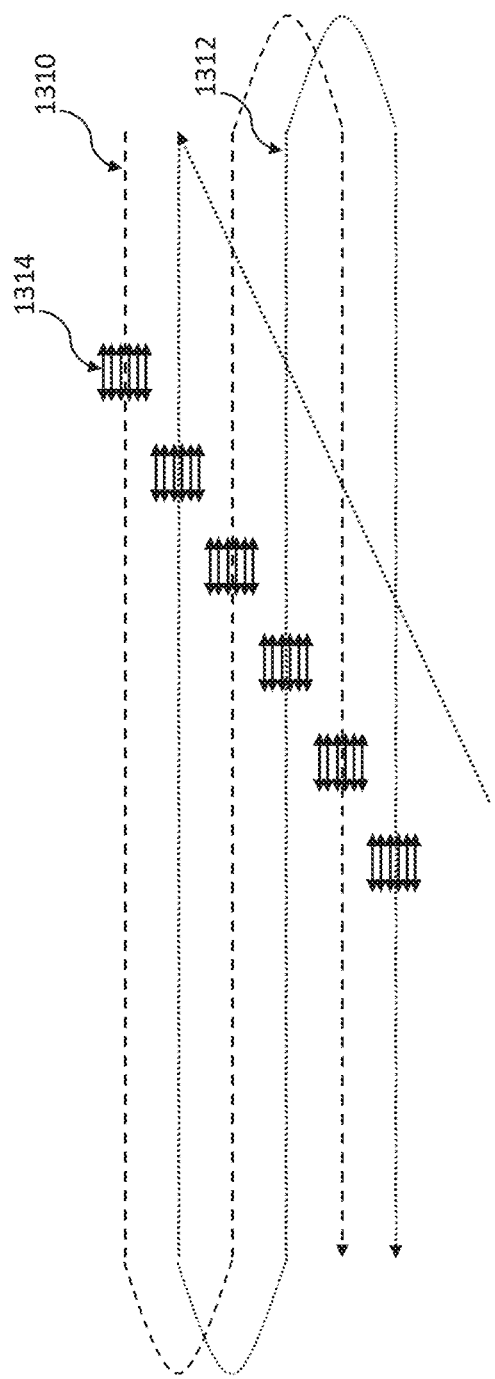
FIG. 13 is an image illustrating interlaced comb scanning consistent with some embodiments of the present disclosure.

FIG. 13 provides a conceptual view of how a "comb" made up of laser light beams can be projected toward the LIDAR FOV and used to scan the FOV according to the disclosed interlaced scanning techniques. For example, a first group of deflector scan lines 1310 may be scanned during a first half of a LIDAR FOV frame capture, and a second group of deflector scan lines 1312 can be scanned during the second half of the LIDAR FOV frame capture. In this particular example, an array of laser beams may be projected toward the FOV such that multiple beams of light (e.g., a light "comb") are projected as the deflector moves according to deflector scan lines 1310 and 1312. Such a comb may result in multiple FOV scan lines 1314 associated with each deflector scan line. In the example of FIG. 13, six light beams are projected from an array of six laser sources. In this way, and relative to the example of FIG. 13, as the deflector moves to scan the LIDAR FOV, each deflector scan line results in six corresponding FOV scan lines 1314. The vertical tilt increment of the deflector can be selected such that the FOV scan lines are evenly spaced across the FOV. Alternatively, the vertical tilt increment of the deflector can be selected such that the FOV scan lines 1314 resulting from different deflector scan lines at least partially overlap. Using such a technique, certain regions of interest in the FOV (e.g., near the horizon, in a region associated with a detected object, etc.) may be scanned at a higher scan resolution.

As represented by FIG. 13, the laser light comb, resulting in FOV scan lines 1314, may be steered horizontally across the width of the FOV by the 2-D scanner, and the horizontal resolution may be determined by the scanning speed and the pulse rate of the laser sources. Additionally, while this example is described relative to a vertically oriented laser array scanned horizontally over the FOV, some embodiments may employ a horizontally oriented light source array in which a horizontally oriented 1-D array of transmitted laser light spots are scanned vertically over the FOV. Further, 2-D arrays of laser sources may also be employed. The lasers may be arranged in a square or rectangular pattern or any other type of pattern (e.g., hexagonally packed, etc.).

In some embodiments, a first set of laser sources of the array of laser sources may be selected to be active during a first clock cycle and a second set of laser sources of the array of laser sources, different from the first set of laser sources, may be selected to be inactive during the first clock cycle. For example, a particular laser array may include 48 closely spaced laser sources (or any number of laser sources). In this particular example, each laser source may have angular dimensions of 0.1 deg×0.05 deg. While in some cases, all laser sources may be activated simultaneously, in this case, every other laser source may be operated during an illumination event (e.g., a single, clock-timed pulse from selected laser sources from among the array). Operation of every other laser source in the closely spaced laser array would provide a 1:1 ratio of active to inactive spaces. Similarly, every third laser source may be operated during an illumination event in order to provide a 1:3 ratio of active to inactive space. In this particular example, where each closely spaced laser source has an angular dimension of 0.1 deg×0.05 deg, operating every third laser source would result in a spacing between active laser sources of about 0.15 degrees (or about 2.6 mrad).

In some embodiments, a laser array may include the same laser source array as described above (i.e., an array of 48 closely spaced lasers each having an angular dimension of 0.1 deg×0.05 deg). In this example, a 1:2 ratio of active space to inactive space may be achieved by illuminating together the first two lasers in each group of six (e.g., lasers 1, 2, 7, 8, 13, 14, etc.) and leaving the remaining lasers inactive. In this case, each group of two illuminated lasers may have total angular dimensions of 0.1 deg×0.1 deg, and spacing between active laser groups may be 0.3 degrees, or about 5.23 mrad, which may satisfy a particular standard for eye safety. A 1:2 ratio of active to inactive space may be achieved by illuminating together the first four lasers in each group of 12 (e.g., lasers 1, 2, 3, 4, 13, 14, 15, 16, etc.) and leaving the remaining lasers inactive. In this case, each group of four illuminated lasers will have total angular dimensions of 0.1 deg×0.2 deg, and spacing between active laser groups will be 0.4 degrees, or about 7 mrad, which may satisfy a particular standard for eye safety.

In some embodiments, the at least one light source may include a monolithic multichannel laser with a plurality of active areas separated by one or more inactive areas. For example, a 1-D laser array may be configured to operate with a 1:1 ratio of active laser channels to inactive interstitial space between the laser channels. This may be accomplished in several ways. In one case, 16 laser channels may be arranged in a 1-D array such that each pair of adjacent laser sources is separated by an interstitial inactive space of equal size as each laser source. As a result, the 1-D array would include an alternating and repeating sequence of one laser source adjacent to one similarly-sized interstitial inactive space in the array. Other 1:1 ratio array configurations may also be used. In one example, eight active laser channels may be interleaved by eight similarly sized inactive spaces. In another example, four active laser channels may be interleaved by four similarly sized inactive spaces. In each case, the power of the laser sources may be selected to provide a desired total power. In one example, the sixteen-channel array may include sixteen 30 W laser sources, the eight-channel array may include eight 60 W laser sources, and the four-laser source array may include four 120 W lasers, all yielding a total maximum power of 480 W. The emitters may have any suitable power level (e.g., between 20 W to 200 W). The shape of the emitted beam (spot) may be symmetrical, or elongated in one axis. Elongation may enhance eye safety in some cases. To further promote eye safety, the ratio of active to inactive spacing in the laser array may be selected to preserve a minimum angular spacing between active laser beams. The minimum spacing may be determined by a government or safety standards organization, for example. In some cases, the minimum angular spacing may be 5 mrad, or about 0.29 degrees.

In some embodiments, a 1:2 ratio array may be used. For example, each of the example arrays described above may include interstitial inactive spaces of two times the width of each laser source. Thus, in each of the 16-channel, 8-channel, and 4-channel array examples, each pair of laser sources may be separated by an inactive space with twice the width of one of the laser sources. In some embodiments, a 1:5 ratio (or other suitable ratio) may be used. In this example, each active laser source may be separated by an inactive space having a width equal to five times the width of one of the laser sources.

The ratio of active laser sources to inactive interstitial spaces in the laser array may be achieved in any suitable way. In some examples, each laser source may simply be spaced apart by an inactive material (e.g., any non-laser emitting material). In another example, however, the ratios may be obtained by using an array of closely packed laser sources electronically controlled in a manner to provide a desired spacing ratio (e.g., to meet the requirements of a particular application, a particular sensing situation, eye safety requirements, etc.). In such a case, the laser array may include, for example, 32 active laser channels that may be operated in various different ratio modes. For example, a 32 channel laser array may be operated in a 1:1 active to inactive space arrangement by activating every other channel together (16 channels), while leaving the interleaving 16 laser sources inactive. In one operational mode, only one set of 16 channels may be pulsed to emit laser light, while the other 16 channels remain inactive. In another mode, the two groups of 16 interleaving channels may be alternatingly activated in a 1:1 ratio arrangement. The alternation may occur at a pulse frequency of the laser sources, at any multiple of the pulse frequency, or according to any other timing pattern.

Similar operation may be employed to achieve active to inactive ratios other than 1:1. For example, to provide a 1:2 ratio, each of a set of 8 active laser sources may be spaced apart from one another by 2 inactive laser sources. In one mode of operation, the inactive laser sources may remain inactive while pulses are emitted from the eight active sources. In other cases, the set of eight (or other number) active lasers may be varied among the set of 24 total laser sources (while maintaining a spacing between active lasers of two inactive lasers) on any desirable timing pattern (e.g., alternating pulses, a multiple of pulses, etc.). Similar operation schemes may be employed in 1:5 ratio arrays or with arrays operated with any other desired ratio.

In some embodiments, a ratio of inactive to active areas on the monolithic multichannel laser may be determined based on a detection event. While in some cases, the ratio may remain fixed, in other cases, it may be desirable to select the ratio based on a detection event. For example, detection of a pedestrian may warrant selection of a higher ratio of inactive space to active space, e.g., to increase a margin of eye safety. Various other event triggers may also be used to select a desired spacing ratio. In some embodiments, the ratio is adjusted after a first scan of the field of view is complete. For example, a particular laser array may be operated with different active to inactive ratios at different times. During one scan of the FOV or sub-region of the FOV, an array may be operated with a 1:1 ratio. During another scan of the FOV or another sub-region of the FOV, a different ratio (e.g., 1:2; 1:4; 1:5; etc.) may be used. Further, the laser sources selected to be active during a particular clock cycle may be predetermined or may be randomized, while maintaining a desired active to inactive spacing ratio.

As noted, many different laser array configurations may be used according to the requirements of a particular application. A particular laser source array may include 16, 8, or 4 channels, among many other possible numbers of channels. These channels may be configured as part of a fixed laser array, where each laser source is positioned a desired angular distance from its neighboring laser sources. For eye safe configurations, for example, this distance may be at least about 5.2 mrad. In some embodiments, the inactive spaces between laser sources may include any non-light emitting material. In other cases, however, a laser array may be comprised of closely spaced laser sources with little to no non-light emitting material between each laser source in the laser array. Such embodiments may provide a significant level of flexibility, as the sources of the laser array may be selectively operated according to the requirements of a particular application.

In some embodiments, the plurality of laser light beams emitted from the at least one light source and light beams reflected from objects in the field of view of the LIDAR system and returned to the LIDAR system may be directed along a common optical path. For example, the deflector may be part of a monostatic configuration of the LIDAR system wherein projected light exiting from the LIDAR system and the reflected light entering the LIDAR system pass through substantially similar optical paths. Using a common optical path both to transmit the laser light emitted from the laser array to the 2-D scanner and toward the FOV and to direct the reflected light received at the 2-D scanner from the FOV to the sensor array may provide significant advantages in terms of reduced complexity, lower cost, reliability, and performance.

In some embodiments, the at least one processor causes, based on detection of a triggering event, adjustment of at least one of a laser pulse frequency associated with the at least one light source or a tilt increment associated with the at least one deflector to selectively adjust a scan resolution relative to the field of view of the LIDAR system. For example, the triggering event may include detection of a target vehicle in the field of view of the LIDAR system. In some embodiments, the triggering event may include detection of a moving object in the field of view of the LIDAR system, wherein the detection of the moving object is based on reflections signals associated with the first and second scan patterns.

The available resolution of a LIDAR system may be dependent upon many factors. In some cases (e.g., a single laser source system), the resolution may depend on factors including the mirror tilt increments used between scan lines and the laser pulse frequency used while scanning over the scan lines. In other cases, such as a multi-laser system, the available resolution may also depend on the spacing between laser sources in a laser array in addition to the mirror tilt increments and the laser pulse frequency during scanning. For instance, in one example, the point cloud vertical resolution may depend on line spacing while the horizontal resolution may depend on the frequency at which the single laser source is pulsed as the 2-D scanning mirror scans along each horizontal scan line. The higher the pulse frequency, the higher the potential resolution of the generated point cloud from the LIDAR system.

In some multi-beam systems, point cloud resolutions may be achieved that are higher than what is achievable by varying mirror tilt increments and laser pulse frequency alone. For example, for a laser source with N1 laser spots, each divided by N2 pixels with the detector, and laser [active:non active] ratio of [1:N3−1], a resolution is achieved by the following:

Res=line spacing/($N1*N2*N3$)

The described laser source arrays can be characterized by their effective angular dimension (e.g., what portion of a solid angle of the LIDAR FOV light from the array is projected toward). In one example, laser source arrays may have an angular dimension of 2.4 degrees. Therefore, if during a scan of a LIDAR FOV, the scanning mirror is incremented about its vertical scanning axis by 2.4 degrees between each scan pattern line, then the FOV will be scanned with horizontal scan lines spaced apart by an angular dimension dictated by the laser source spacing in each array. For example, the 4-channel array scanned at 2.4 degree vertical increments would result in horizontal scan lines separated by 0.6 degrees. The 8-channel array would provide horizontal scan lines separated by 0.3 degrees, and the 16-channel array would provide horizontal scan lines separated by 0.15 degrees.

It should be noted that the described laser arrays can be selectively operated with any number of active channels, and the number of active channels may be varied during a single frame scan of the LIDAR FOV, during a scanning along a single scan line of a scan pattern, or over any time interval or spatial region relative a LIDAR FOV scan.

The described laser arrays and scanning systems allow for the possibility of achieving horizontal scan line spacing even closer than the spacing between active lasers in the laser array such that in some embodiments, the at least one deflector may be further configured to scan with angular line increments that are less than or equal to an angular size of a laser array of the at least one laser source. For example, as discussed above, the scanning mirror may be controlled such that it rotates about its vertical tilt axis by an angular increment less than the angular dimension of the laser array. In such embodiments, controlled rotation of the mirror may provide scan patterns having horizontal line spacings less than the spacing between laser sources in the laser array. In some cases, the spacing between scan lines may correspond to an angular dimension of a single laser source in the array (e.g., 0.05 degrees in the 16 channel example above, 0.1 degree in the 8-channel example, and 0.2 degrees in the 4-channel example).

In some embodiments, the vertical rotation of the scanning mirror may be controlled to provide a variable resolution scan. For example, for regions near the top and bottom of the scan, the scanning mirror may be rotated about its vertical tilt axis by an angular increment at least as large as the angular dimension of the laser array. In a region including the horizon (e.g., between +/−5 degrees), however, the scanning mirror may be rotated about its vertical tilt axis by an angular increment less than the angular dimension of the laser array.

In some embodiments, an array of 16 laser sources may be used and operated in a 1:2 active source to inactive area ratio. In this example, there would be 16 laser beams, each emitted by a group of two adjacent laser sources. Each laser source would have a vertical angular dimension of 0.05 degrees, such that each of the 16 laser beams may be emitted from a two-laser source group having a total vertical dimension of 0.1 degrees. Active laser groups would be spaced apart by inactive space having a total vertical angular dimension of 0.2 degrees. This would provide a 1:2 ratio of active to non-active space in the array. Thus, the horizontal spacing of lines scanned by the 16-source laser array is 0.3 degrees. The total vertical angular dimension of the laser array, which includes 16 sources having a 0.1 degree angular dimension separated by 15 interstitial inactive spaces each with a 0.2 degree angular dimension, would be about 4.6 degrees.

In the example above, the 16-source array may be scanned in a non-overlapping mode relative to regions of the FOV from about +6 degrees to +21 degrees and from about −6 degrees to about −21 degrees. In these regions, the scanning mirror may be rotated by about 4.8 degrees about its vertical scanning axis between horizontal scans. This would result in three scans over the +6 degrees to +21 degrees region and three scans over the −6 degrees to about −21 degrees region where the horizontal scan lines generated by the 16 laser sources are spaced apart by 0.3 degrees. In these regions, the pulse frequency of the laser sources may be set in conjunction with the horizontal scanning speed of the mirror to any suitable resolution. In some cases, the frequency may be set such that sequential pulses are spaced apart by about 0.3 degrees. Combining this horizontal resolution with the vertical resolution in the regions from about +6 degrees to +21 degrees and from about −6 degrees to about −21 degrees would provide an overall resolution in these regions of 0.3 degrees by 0.3 degrees.

In some embodiments, based on detection of a triggering event, the at least one processor may cause adjustment of a laser pulse frequency associated with the at least one light source, wherein adjustment may include increasing the laser pulse frequency associated with the at least one light source to increase the resolution of the point cloud associated with the first and second series of scan lines. For example, a region between about −6 degrees to about +6 degrees (which may include the horizon) may correspond to a region of higher interest where a higher resolution may be desired. This higher resolution may be accomplished, for example, by increasing the laser pulse frequency in these regions.

In some embodiments, based on detection of a triggering event, the at least one processor may cause adjustment of the tilt of a mirror associated with the at least one deflector such that a distance between two or more scan lines of the first and second series of scan lines is decreased. For example, a region between about −6 degrees to about +6 degrees (which may include the horizon) may correspond to a region of higher interest where a higher resolution may be desired. This higher resolution may be accomplished, for example, by incrementing the tilt of the scanning mirror about its vertical scanning axis by an amount less than the total angular dimension of the laser array. For example, in the region between about −6 degrees to about +6 degrees, six horizontal scans may be performed. Spacing the horizontal scans of the laser array more closely together can provide a higher resolution in the vertical direction.

The resolution may be increased even further. For example, by generating each of the 16 laser beams from just one of the two laser sources, each of the generated beams may be emitted from a source having a vertical angular dimension of 0.5 degrees. By overlapping subsequent horizontal scans, and further adjusting the laser pulse frequency, a resolution of 0.05 degrees×0.05 degrees (for example) may be provided. Such a technique may be used, for example, to scan certain regions of interest (ROI). Such ROIs may be predetermined within an FOV or may be identified based on a triggering event, such as a detection of a particular object or object type, a partial object detection, detection of an object within a certain distance range, detection of overlapping objects, etc.

For a scan including enhanced resolution in regions including the horizon and/or in regions of interest, the distance between each scan line (or vertical angular displacement) may be smaller than the total length of the multiple beam spots in the laser array. In this way, some of the area scanned would 'overlap' with the previous scan line, such that more pixels may be sampled in the overlapping portion. Higher resolution may be obtained by using multibeam scanning and controlling the vertical offset of the scan such that there is overlap between some of the regions that were previously scanned, and the subsequent scan. For example, a subregion in an FOV (e.g., 5-15 degrees) may have a resolution of 0.15×0.3, whereas at the center of an ROI region, the resolution may increase to 0.05×0.05. In between these regions, there may be a transition resolution that is between the lower resolution and the higher resolution.

Figure 14:
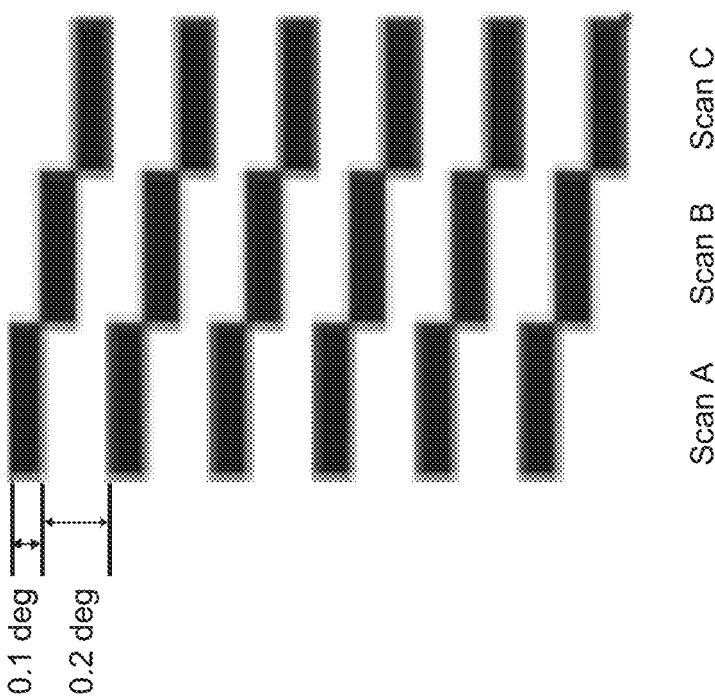
FIG. 14 illustrates overlapping scans of a multi-beam light source consistent with some embodiments of the present disclosure.

In some embodiments, the distance between scan lines (i.e., corresponding to the angular displacement of the scanning mirror about its vertical scanning axis) may be equal to ⅓ of the angular length of the laser array such that the resolution may be increased to 3× that of the multibeam resolution. In other words, in an example including a 1:2 active to passive space ratio laser array, shifting the light from the laser array vertically by ⅓ the angular length of the array on subsequent horizontal scans enables scanning of some of the regions overlapped only by passive areas of the laser array during prior scans. FIG. 14 illustrates the increased resolution achievable through overlapping scans of a multi-beam light source. As shown, during Scan A, horizontal lines of the LIDAR FOV are scanned at a vertical resolution of 0.3 degrees (i.e., the spacing between active laser sources in the array). During a subsequent horizontal scan, Scan B, the scanning mirror is angularly displaced only ⅓ of the vertical angular dimension of the laser array. As a result, Scan B partially overlaps with Scan A. As represented by FIG. 14, this overlap in scans results in ½ of the inactive region of Scan A being scanned during Scan B. Similarly, in a subsequent Scan C where the mirror is again tilted only by ⅓ of the vertical angular dimension of the laser array, the other half of the inactive region of Scan A is covered by Scan C. As a result, the vertical resolution achievable in this overlapping region may be increased from 0.3 degrees, using Scan A alone, to 0.1 degree using the overlap of Scans A, B, and C. Using this technique, a resolution compared to a laser pitch may be obtained. In cases where the laser spot is split using the receiver, then a vertical resolution of 0.05 degrees may be achieved.

In some embodiments, one or more overlapping scans may be performed relative to selected ROIs to provide higher resolutions in those regions. The one or more subsequent overlapping scans, however, need not include horizontal scans of the entire LIDAR FOV. Rather, the subsequent scans may be focused on any of one or more sub-regions of the LIDAR FOV having a width less than or equal to the entire FOV.

Multi-step scans entail scanning a first region in a consecutive manner during a first time period, and subsequently scanning a second region (e.g. a subregion of the of the LIDAR FOV) during a second time period. In some cases, the sub-region of interest may extend across the entire FOV, and in other cases, the sub-region of interest may have a width less than the FOV. Multi-step scans may include completing a scan of the entire FOV with low resolution, and subsequently scanning a subsection of the vertical FOV (vFOV) with high resolution (e.g., at a slower rate and higher pulse rate). The subsection can either be of the full horizontal range (this solution may be implemented for a resonant horizontal scan), or for a subsection of the horizontal FOV (HFOV) and vFOV. The multi-step scans including a subsequent scan of a subregion with the full range of the FOV in at least one axis (e.g. horizontal) may advantageously be implemented with a scanner scanning at a resonant oscillation in the horizontal direction. Multi-step scans including a subsequent scan of a subsection of the horizontal range and the vertical range may be accomplished with quasi-static control of the scanning rate in both directions, or a tunable resonance of the scanner.

The disclosed embodiments may benefit from multiple beams, variable resolution along both vertical and horizontal axes (e.g., by different mechanisms), variable resolution "gradient" (low->high->higher), variation in vertical axis and overlap between multiple beam scans, resonant vs non-resonant scans, and thermal management offered by the ability to selectively control the laser pulse frequency associated with horizontal scanning resolution. All of the principles, configurations, and embodiments discussed above also apply to vertical scanning systems, in which the scanning mirror is incremented angularly about its horizontal scanning axis after each vertical scan of the LIDAR FOV accomplished by rotating the scanning mirror about its vertical scanning axis.

In some embodiments, the scanning pattern may be pre-distorted in order to account for distortions, and a rectangular point cloud may be obtained. Certain distortions may result in a LIDAR system scan due to the angular projects of light reflections. Such distortions, known as keystone distortions, result in a non-rectangular point cloud shaped as a trapezoid as opposed to a desired rectangle. In order to correct for this effect, rather than completing the horizontal line scans each at a fixed vertical tilt increment of the scanning mirror, the scanning mirror may be rotated about its vertical scan axis (e.g., to address keystone effects) at the same time it rotates about its horizontal scan axis (e.g., to complete each horizontal line scan).

In some embodiments, the scanning mirror may rotate at different angular velocities relative to its horizontal and vertical scan axes. For example, the scanning mirror may rotate more slowly about its vertical scan axis than about its horizontal scan axis. The resulting mirror rotations produce a horizontal scan pattern. It should be noted that the converse may be true in certain embodiments. For example, a scanning mirror may rotate more slowly about its horizontal scan axis relative to rotations about its vertical scan axis. Such operation can be used to produce a vertical scan pattern. The distance between the rows in the illustrated horizontal scan is the vertical offset between scans. In this particular scan, the distance between scan lines, or vertical angular displacement may vary to provide regions of higher potential point cloud resolution (e.g., in a region including the horizon or in any other region of interest).

Each scan line may be scanned with multiple laser beams (e.g., generated using a laser array as described above). With this type of multi-beam scanning, as the mirror follows the lines of the scan pattern, the areas between the lines in the scan pattern are filled in (or scanned) with individual scan lines each associated with one of the multiple laser beams being simultaneously projected toward the FOV by the scanning mirror. In some examples, the distance between each line in the scan pattern may be equal to or larger than the total angular coverage provided by the multiple beam spots of the laser source array. In other cases, as discussed in examples above, the distance between at least some lines in the scan pattern may be less than the total angular coverage provided by the multiple beam spots of the laser source array.

As described above, in some cases a laser array may include a fixed number of laser channels each spaced apart by inactive, non-light emitting material. In such cases, higher resolutions may be achieved in certain ROIs along the vertical (or horizontal) direction using the partially overlapping technique described above.

Figure 15:
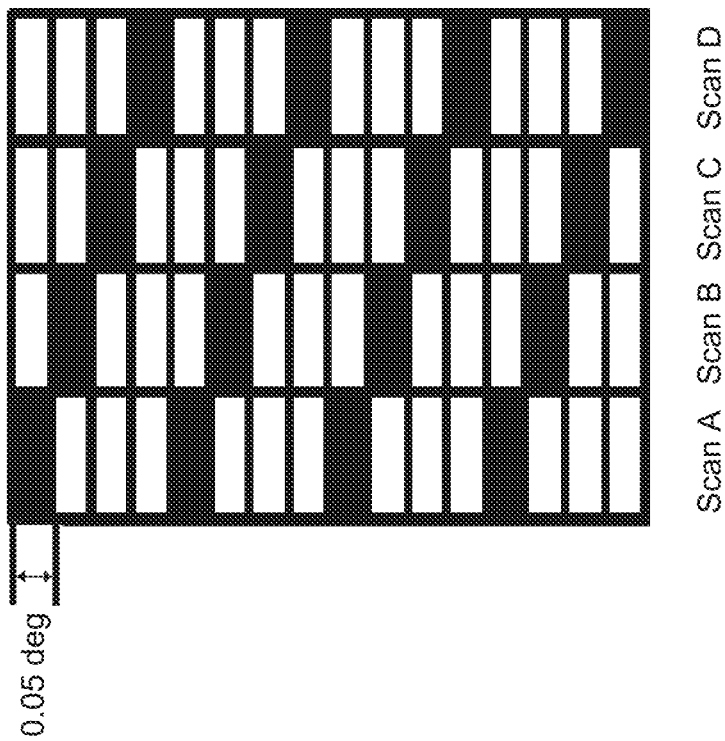
FIG. 15 illustrates an exemplary laser array configuration consistent with some embodiments of the present disclosure.

In some embodiments, as represented by FIG. 15, the laser array may include an array of closely spaced lasers that can be operated according to various illumination timing schemes. Such electronic control may enable variable and selectable ratios of active to non-active space along the laser array and may enable high-resolution scanning through electronic control of the laser source illumination. For example, FIG. 15 represents a laser array comprising 16 closely spaced laser sources each having a vertical angular dimension of 0.05 degrees. During a first scan (Scan A) of a region of interest in an FOV, every fourth laser source is activated such that there is an inactive space between laser sources of 0.15 degrees, and each active source is spaced apart by 0.2 degrees. During Scan A, lasers 1, 5, 9, and 13 are active. This particular example results in an active to inactive space ratio of 1:3.

During a subsequent scan B, rather than angularly displacing the scanning mirror to a new vertical orientation in order to perform the next set of horizontal scan lines, the mirror may remain at the same vertical orientation that was used for scan A, whether that is a fixed orientation or a certain predetermined rotational path to correct for keystone effects. In addition, instead of rotating the mirror vertically to scan lines previously included in the inactive space associated with the array during Scan A, a different set of lasers may be illuminated during horizontal Scan B. In the example shown, lasers 2, 6, 10, and 14 are illuminated. Similarly in Scan C, the mirror can again remain in the same vertical orientation as used during Scans A and B. In Scan C, lasers 3, 7, 11, and 15 may be activated. And in Scan D, lasers 4, 8, 12, and 16 may be activated. In this way, four sequential, horizontal scans may be made of a region of a FOV without changing the vertical scan orientation/pattern. In this region, however, the effective resolution achieved is greater than the resolution available from any one of Scans A, B, C, or D. Where Scan A may offer a vertical resolution of 0.2 degrees, the potential vertical resolution achievable with the aggregate of Scans A, B, C, and D is 0.05 degrees.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:
at least one light source;
at least one deflector configured to scan light emitted by the at least one light source over a field of view of the LIDAR system; and
at least one processor configured to:
cause the at least one deflector to scan the field of view of the LIDAR system with a first scan pattern including a first series of scan lines and subsequently with a second scan pattern including a second series of scan lines that are interlaced with the first series of scan lines; and
determine a velocity of at least one target object, wherein the velocity is in a direction perpendicular to an orientation of the first and second series of scan lines.

2. The LIDAR system of claim 1, wherein the first and second series of scan lines are oriented horizontally, and the at least one processor is further configured to determine a longitudinal velocity of at least one target object based on a plurality of return signals resulting from the first scan pattern and the second scan pattern.

3. The LIDAR system of claim 1, wherein the first and second series of scan lines are oriented vertically, and the at least one processor is further configured to determine both a lateral and a longitudinal velocity of at least one target object based on a plurality of return signals resulting from the first scan pattern and the second scan pattern.

4. The LIDAR system of claim 1, wherein, based on detection of a triggering event, the at least one processor is further configured to cause adjustment of a laser pulse frequency associated with the at least one light source, wherein adjustment includes increasing the laser pulse frequency associated with the at least one light source to increase the resolution of a point cloud generated based on the first and second series of scan lines.

5. The LIDAR system of claim 1, wherein, based on detection of a triggering event, the at least one processor is further configured to cause adjustment of a tilt of a mirror associated with the at least one deflector such that a distance between two or more scan lines of the first and second series of scan lines is decreased.

6. The LIDAR system of claim 1, further comprising at least one receiver to receive reflected light, wherein the receiver includes a monolithic multichannel receiver.

7. The LIDAR system of claim 1, wherein the at least one light source includes a monolithic multichannel laser with a plurality of active areas separated by one or more inactive areas.

8. The LIDAR system of claim 7, wherein a ratio of inactive to active areas on the monolithic multichannel laser is determined based on a detection event.

9. The LIDAR system of claim 8, wherein the ratio is adjusted after a first scan of the field of view is complete.

10. The LIDAR system of claim 1, wherein the at least one deflector is further configured to scan with angular line increments that are less than or equal to an angular size of a laser array of the at least one laser source.

11. A LIDAR system, comprising:
at least one light source configured to simultaneously emit a plurality of laser light beams;
at least one deflector configured to scan the plurality of laser light beams emitted by the at least one light source over a field of view of the LIDAR system; and
at least one processor configured to cause the at least one deflector to scan the field of view of the LIDAR system with a first deflector scan pattern including a first series of scan line sets and subsequently with a second deflector scan pattern including a second series of scan line sets that are interlaced with the first series of scan line sets.

12. The LIDAR system of claim 11, wherein the first and second series of scan line sets are oriented horizontally, and the at least one processor is further configured to determine a longitudinal velocity of at least one target object based on a plurality of return signals resulting from the first deflector scan pattern and the second deflector scan pattern.

13. The LIDAR system of claim 11, wherein the first and second series of scan line sets are oriented vertically, and the at least one processor is further configured to determine both a lateral and a longitudinal velocity of at least one target object based on a plurality of return signals resulting from the first deflector scan pattern and the second deflector scan pattern.

14. The LIDAR system of claim 11, wherein the plurality of laser light beams emitted from the at least one light source and light beams reflected from objects in the field of view of the LIDAR system and returned to the LIDAR system are directed along a common optical path.

15. The LIDAR system of claim 11, wherein the at least one light source include an array of laser sources.

16. The LIDAR system of claim 15, wherein a first set of laser sources of the array of laser sources is selected to be active during a first clock cycle and a second set of laser sources of the array of laser sources, different from the first set of laser sources, is selected to be inactive during the first clock cycle.

17. The LIDAR system of claim 11, wherein the at least one light source includes a monolithic multichannel laser with a plurality of active areas separated by one or more inactive areas.

18. The LIDAR system of claim 17, wherein a ratio of inactive to active areas on the monolithic multichannel laser is determined based on a detection event.

19. The LIDAR system of claim 18, wherein the ratio is adjusted after a first scan of the field of view is complete.

20. A LIDAR system, comprising:
at least one light source;
at least one deflector configured to scan light emitted by the at least one light source over a field of view of the LIDAR system; and
at least one processor configured to:
cause the at least one deflector to scan the field of view of the LIDAR system with a scan pattern including a first series of scan lines and subsequently with a second scan pattern including a second series of scan lines that are interlaced with the first series of scan lines to provide a single frame scan pattern; and
analyze reflection signals associated with the single frame scan pattern to determine whether at least one target object present in the field of view of the LIDAR system is moving.

21. The LIDAR system of claim 20, wherein at least one processor is further configured to determine a velocity of at least one target object based on a plurality of return signals resulting from the first scan pattern and the second scan pattern.

22. The LIDAR system of claim 21, wherein the processor is further configured to generate a point cloud based on the reflection signals associated with the single frame scan pattern.

23. The LIDAR system of claim 22, wherein the processor is further configured to adjust at least one aspect of a representation of the at least one target object in the point cloud based on the detected velocity.

24. The LIDAR system of claim 23, wherein data points associated with the point cloud include the detected velocity of the at least one target object.

25. The LIDAR system of claim 20, wherein the first and second series of scan lines are oriented horizontally, and the at least one processor is further configured to determine a longitudinal velocity of the at least one target object based on a plurality of return signals resulting from the single frame scan pattern.

26. The LIDAR system of claim 20, wherein the first and second series of scan lines are oriented vertically, and the at least one processor is further configured to determine both a lateral and a longitudinal velocity of the at least one target object based on a plurality of return signals resulting from the single frame scan pattern.

* * * * *